United States Patent
Ghofranian et al.

(10) Patent No.: US 9,302,793 B2
(45) Date of Patent: Apr. 5, 2016

(54) SPACECRAFT DOCKING SYSTEM

(71) Applicant: The Boeing Company, Chicago, IL (US)

(72) Inventors: Siamak Ghofranian, Yorba Linda, CA (US); Li-Ping Christopher Chuang, Laguna Niguel, CA (US); Pejmun Motaghedi, Cerritos, CA (US)

(73) Assignee: THE BOEING COMPANY, Chicago, IL (US)

( * ) Notice: Subject to any disclaimer, the term of this patent is extended or adjusted under 35 U.S.C. 154(b) by 57 days.

(21) Appl. No.: 14/221,357

(22) Filed: Mar. 21, 2014

(65) Prior Publication Data

US 2015/0266595 A1 Sep. 24, 2015

(51) Int. Cl.
  *B64G 1/64* (2006.01)
  *B64G 1/22* (2006.01)

(52) U.S. Cl.
  CPC ............... *B64G 1/646* (2013.01); *B64G 1/222* (2013.01)

(58) Field of Classification Search
  CPC ............................... B64G 1/646; B64G 1/222
  See application file for complete search history.

(56) References Cited

U.S. PATENT DOCUMENTS

| | | | | |
|---|---|---|---|---|
| 3,820,741 A | * | 6/1974 | Ratcliff | 244/172.4 |
| 3,910,533 A | * | 10/1975 | Cheatham et al. | 244/172.4 |
| 4,809,936 A | * | 3/1989 | Whitaker | 244/172.4 |
| 4,858,857 A | * | 8/1989 | Lange et al. | 244/172.4 |
| 4,860,975 A | | 8/1989 | Schliesing et al. | |
| 5,094,410 A | * | 3/1992 | Johnson | 244/172.4 |
| 6,354,540 B1 | | 3/2002 | Lewis et al. | |
| 7,543,779 B1 | | 6/2009 | Lewis et al. | |

OTHER PUBLICATIONS

Carreau, "NASA, ISS Partners Eye New Universal Docking System," Penton, Aviation Week: Space News article, Dec. 2012, 2 pages, accessed Nov. 12, 2013. http://www.aviationweek.com/Article.aspx?id=%2Farticle-xml%2Fawx__12__26__2012__p0-528782.xml.
"NASA Decides to Adopt Boeing SIMAC Design for Docking and Is Retiring the iLIDS Design," SpaceRef Interactive Inc., NASA Internal Memo, Nov. 2012, 1 page, accessed Nov. 12, 2013. http://spaceref.com/news/viewsr.html?pid=42614.
Ghofranian et al., "Simulation of Shuttle/Mir Docking," 36th Structures, Structural Dynamics, and Materials Conference and Adaptive Structures Forum, AIAA/ASME/AHS/ASC, Apr. 10-12, 1995, 12 pages.
Ghofranian et al., "International Space Station Docking System: Testing, Modeling, and Dynamic Simulation," The 2003 Spacecraft and Launch Vehicle Dynamics Environments Workshop, Jun. 17-19, 2003, 16 pages.

(Continued)

*Primary Examiner* — Joseph W Sanderson
(74) *Attorney, Agent, or Firm* — Yee & Associates, P.C.

(57) ABSTRACT

A method and apparatus for docking a spacecraft. The apparatus comprises elongate members, movement systems, and force management systems. The elongate members are associated with a docking structure for a spacecraft. The movement systems are configured to move the elongate members axially such that the docking structure for the spacecraft moves. Each of the elongate members is configured to move independently. The force management systems connect the movement systems to the elongate members and are configured to limit a force applied by the each of the elongate members to a desired threshold during movement of the elongate members.

20 Claims, 16 Drawing Sheets

(56) References Cited

OTHER PUBLICATIONS

Ghofranian, et al. "Space Shuttle Docking to Mir, Mission 1," 36th Structures, Structural Dynamics, and Materials Conference and Adaptive Structures Forum, AIAA/ASME/ASCE/AHS/ASC, Apr. 10-12, 1995, 8 pages.

International Search Report and Written Opinion, dated Apr. 29, 2015, regarding Application No. PCT/US2014/066553, 12 pages.
"International Docketing System Standard (IDSS) Interface Definition Document (IDD); Revision C," Nov. 20, 2013, 51 pages.

* cited by examiner

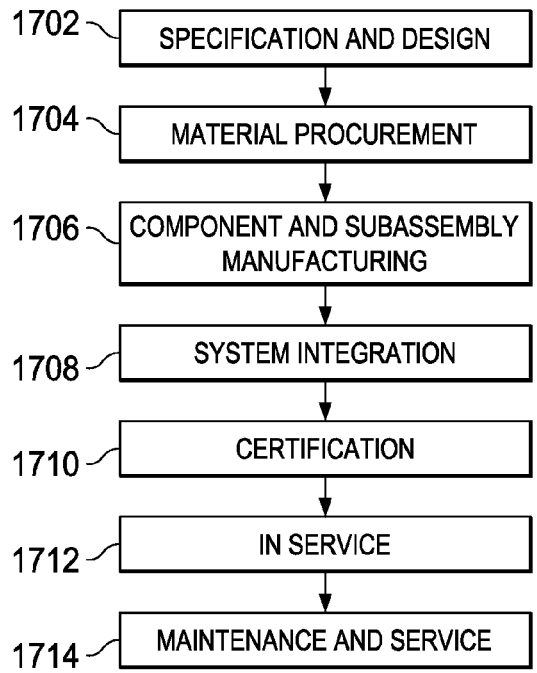
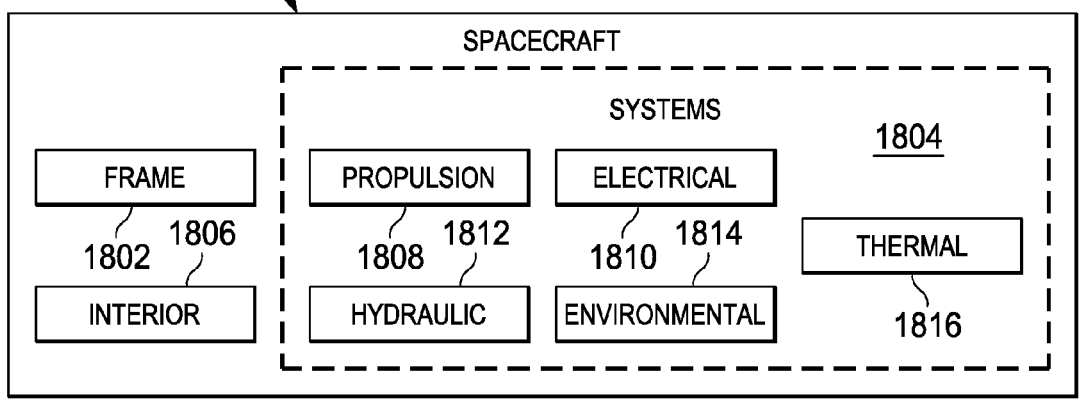

SPACECRAFT DOCKING SYSTEM

GOVERNMENT LICENSE RIGHTS

The disclosure described herein was made in the performance of work under NASA Contract No. NAS8-01099 and is subject to the provisions of Section 305 of the National Aeronautics and Space Act of 1958 (72 Stat. 435: 42 U.S.C. 2457). NASA has certain rights in this application.

BACKGROUND INFORMATION

1. Field

The present disclosure relates generally to spacecraft and, in particular, to coupling systems for spacecraft. Still more particularly, the present disclosure relates to a method and apparatus for a spacecraft docking system.

2. Background

Spacecraft coupling systems provide a way to mechanically connect two or more spacecraft to each other. A spacecraft, as used herein, is a vehicle, vessel, or machine configured to perform a number of operations in space. Spacecraft may be self-propelled space vehicles configured for short-term space missions, or spacecraft that are configured to remain in space for a longer period of time. In other cases, a spacecraft may be a space station, a satellite, or some other suitable structure.

Coupling two spacecraft may be desirable to transfer resources from one spacecraft to another spacecraft. For example, a space shuttle may dock at a space station to provide crew and supplies for the space station. In other examples, a space shuttle may dock with a satellite to perform maintenance and rework one or more of the components of the satellite.

In this illustrative example, the pair of spacecraft to be coupled includes an active vehicle and a target structure. The active vehicle is the spacecraft that is approaching the target structure. For instance, the active vehicle may be a spacecraft, while the target structure is a space station. The spacecraft approaches the space station for coupling. The coupling of two spacecraft may be referred to as docking or berthing.

With docking, the active vehicle maneuvers under its own propulsion to bring the two halves of the coupling system, one on the active vehicle, and one on the target structure, within the required vicinity of each other. With that requirement satisfied, the docking system is then used to couple the spacecraft together. The docking system is designed to tolerate initial misalignments between vehicles with the docking system providing the ability to still capture, align, and rigidly connect the active vehicle and target structure. In some cases, the active vehicle slows or stops its movement toward the target structure and extends the docking system outward to meet and align with the target structure.

Berthing, on the other hand, occurs when an externally attached device associated with one of the spacecraft is used to bring the active vehicle to within the required vicinity of the target structure. In some cases, this device is a robotic arm that attaches one spacecraft to the other spacecraft and guides the structures toward one another in preparation for coupling.

With the use of coupling systems for spacecraft, controllers are designed to articulate the coupling system in order for the active half of the coupling system to successfully capture the target structure, align the two, and prepare the two halves for establishment of a rigid connection. These controllers for spacecraft coupling systems, however, may be more complex than desired. For example, complex control laws may be needed to ensure that the active vehicle and the target structure engage in a desired manner. These systems also may be heavier than desired for the spacecraft.

Moreover, as the complexity of the control systems for coupling spacecraft increases, the possibility of failure of the coupling system increases due to the more numerous failure possibilities at the subsystem and component level. Therefore, it would be desirable to have a method and apparatus that take into account at least some of the issues discussed above, as well as other possible issues.

SUMMARY

In one illustrative embodiment, an apparatus comprises elongate members, movement systems, and force management systems. The elongate members are associated with a docking structure for a spacecraft. The movement systems are configured to move the elongate members axially such that the docking structure for the spacecraft moves. Each of the elongate members moves independently. The force management systems connect the movement systems to the elongate members and are configured to limit a force applied by each of the elongate members to a desired threshold during movement of the elongate members.

In another illustrative embodiment, a method for docking a spacecraft is presented. Elongate members are moved axially such that a docking structure for the spacecraft moves. Each of the elongate members moves independently. A force is limited and applied by the each of the elongate members to a desired threshold during movement of the elongate members.

In yet another illustrative embodiment, a docking system for a spacecraft comprises a capture ring, elongate members associated with the capture ring, alignment features, motors, and force management systems connecting the motors to the elongate members. The alignment features are positioned along a mating surface of the capture ring and are configured to align the capture ring with a second structure. The motors are configured to move the elongate members axially such that the capture ring of the spacecraft moves with a number of degrees of freedom. Each of the elongate members moves independently. The force management systems are configured to limit a force applied by the each of the elongate members to a desired threshold during movement of the elongate members.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a spacecraft manufacturing and service method in the form of a block diagram in accordance with an illustrative embodiment; and FIG. 18 is an illustration of a spacecraft in the form of a block diagram in accordance with an illustrative embodiment.

DETAILED DESCRIPTION

The illustrative embodiments recognize and take into account one or more different considerations. For example, the illustrative embodiments recognize and take into account that it may be desirable to reduce the complexity of a docking system for a spacecraft. For example, some currently used docking systems for spacecraft use load sensor systems, complex control laws, and software applications to couple one spacecraft to another spacecraft. These systems are prone to complications and may not perform as desired.

The illustrative embodiments also recognize and take into account that reducing the weight of a spacecraft is desirable. For example, reducing the weight of the spacecraft allows a spacecraft to have an increased selection of launch vehicles, or can carry more payload in exchange. A reduction in weight for the spacecraft also may be desirable with respect to performing operations in space. Larger, heavier spacecraft may not maneuver as easily as desired.

The illustrative embodiments recognize and take into account, however, that using docking systems with complex controllers may involve increased hardware to support operations of the controller. This increased hardware may add more weight to the spacecraft than desired.

Thus, the illustrative embodiments provide a method and apparatus for docking a spacecraft. The illustrative embodiments provide a simplified method and docking system that is lighter than currently used docking systems for spacecraft.

In one illustrative example, the apparatus comprises elongate members, movement systems, and force management systems connecting the movement systems to the elongate members. The elongate members are associated with a docking structure for the spacecraft. The movement systems are configured to move the elongate members axially such that the docking structure for the spacecraft moves. Each of the elongate members moves independently of one another. The force management systems are configured to limit a force applied by each of the elongate members to a desired threshold during movement of the elongate members.

Figure 1:
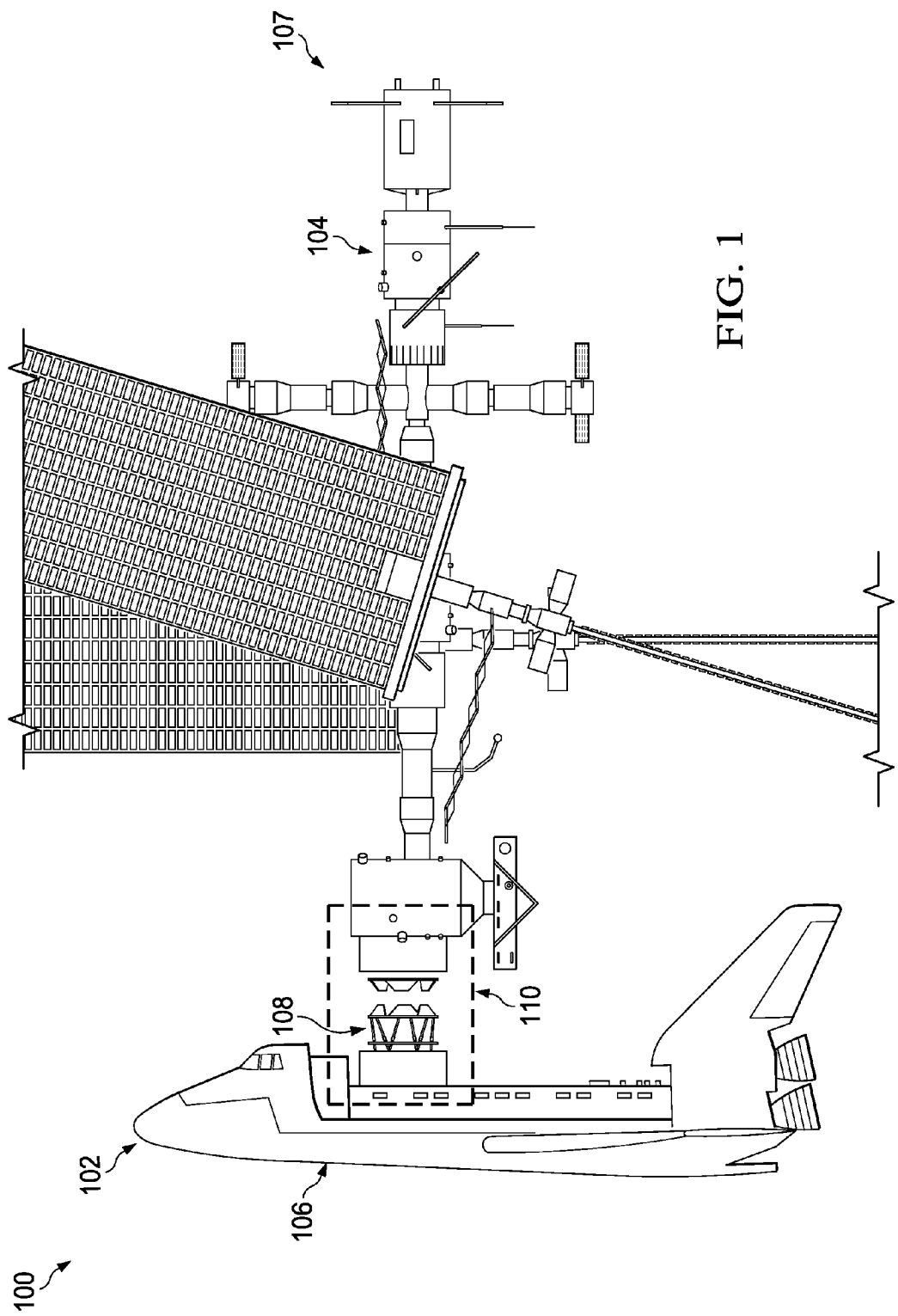
FIG. 1 is an illustration of a docking environment for a spacecraft in accordance with an illustrative embodiment.

Referring now to the figures and, in particular, with reference to FIG. 1, an illustration of a docking environment for spacecraft is depicted in accordance with an illustrative embodiment. In this illustrative example, docking environment 100 includes spacecraft 102 and structure 104. Spacecraft 102 is configured to be coupled to structure 104 in this illustrative example.

As depicted, spacecraft 102 takes various forms. For example, without limitation, spacecraft 102 may be selected from one of a space vehicle, a space shuttle, a satellite, a space station, or some other suitable type of spacecraft. Structure 104 also may take the form of a space vehicle, a space shuttle, a space station, a satellite, or some other suitable structure. Structure 104 also may be a stationary structure in other illustrative examples. In this illustrative example, spacecraft 102 takes the form of space shuttle 106, while structure 104 takes the form of space station 107.

In this depicted example, docking system 108 is associated with spacecraft 102. As used herein, when one component is "associated" with another component, the association is a physical connection in the depicted examples.

For example, a first component, such as docking system 108, may be considered to be associated with a second component, such as spacecraft 102, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second by being formed as part of the second component, an extension of the second component, or both.

Docking system 108 forms a mechanical assembly configured to couple two structures together. In particular, docking system 108 is configured to couple a first structure, space shuttle 106, and a second structure, space station 107.

In this illustrative example, docking system 108 is configured to extend from space shuttle 106 and interact with space station 107. This interaction may be referred to as capture. Capture is the process used to initially couple space shuttle 106 to space station 107 in this illustrative example.

After capture is completed between space shuttle 106 and space station 107, docking system 108 is commanded to align space station 107 and space shuttle 106, followed by retraction of the active ring of docking system 108 to a desired position that supports the final, rigid connecting of docking system 108 to a docking ring in space station 107 to complete the docking process. Docking system 108 is shown in section 110 in this illustrative example.

Figure 2:
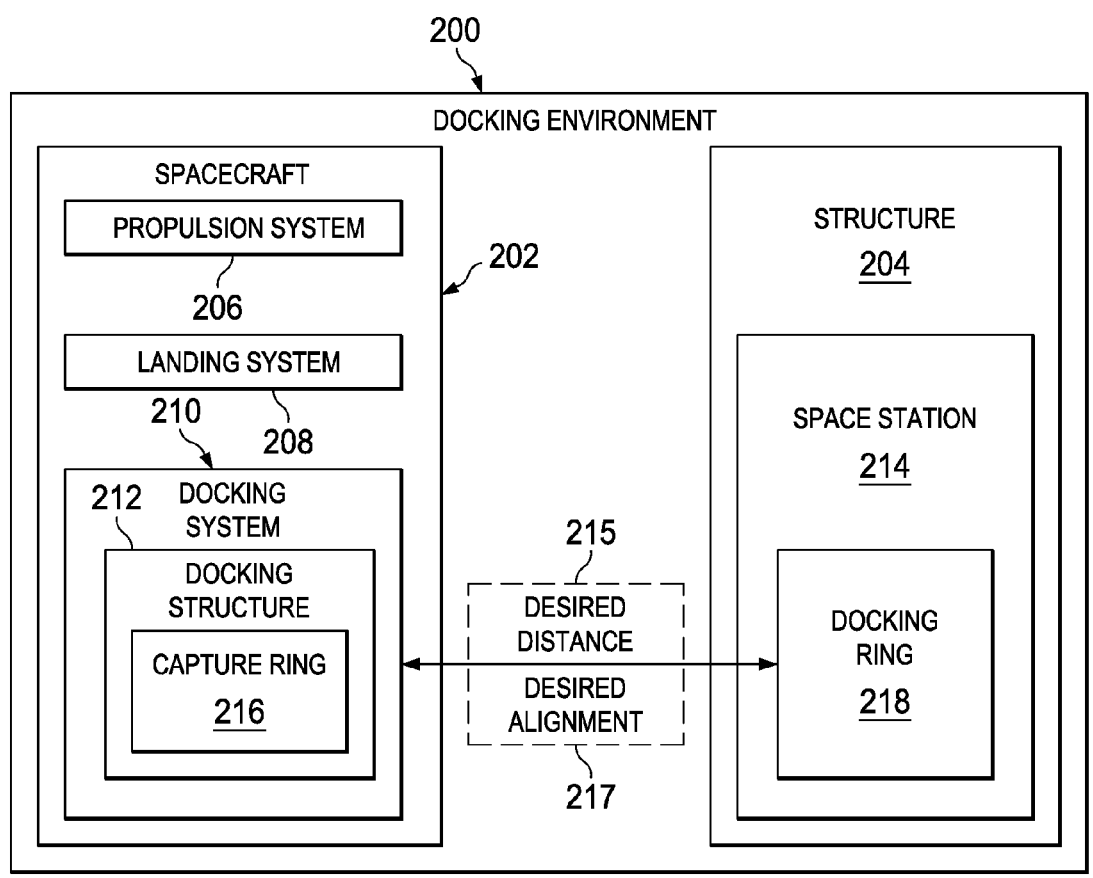
FIG. 2 is an illustration of a block diagram of a docking environment for spacecraft in accordance with an illustrative embodiment.

Turning next to FIG. 2, an illustration of a block diagram of a docking environment for spacecraft is depicted in accordance with an illustrative embodiment. Docking environment 100 in FIG. 1 is an example of one implementation for docking environment 200 shown in block form in this figure.

As depicted, docking environment 200 includes spacecraft 202 and structure 204. Spacecraft 102 and structure 104 in FIG. 1 are examples of an implementation for spacecraft 202 and structure 204 shown in block form, respectively, in this figure.

Spacecraft 202 may take a number of different forms in this illustrative example. For instance, spacecraft 202 may take the form of a space vehicle, a space shuttle, a satellite, a space station, or some other suitable type of structure. In this depicted example, spacecraft 202 is an active vehicle. In other words, spacecraft 202 is moving in some manner in space. Spacecraft 202 may be moving relative to structure 204 in this illustrative example.

As depicted, spacecraft 202 is equipped with propulsion system 206, landing system 208, and docking system 210. Propulsion system 206 is configured to accelerate spacecraft 202. Propulsion system 206 may include at least one of rocket engines, electromagnetic propulsion elements, and other suitable types of mechanisms capable of moving spacecraft 202.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, landing system 208 is configured to assist spacecraft 202 during landing on a desired surface. For example, landing system 208 may be designed to assist spacecraft 202 in landing on the moon. In other examples, landing system 208 includes components configured to protect spacecraft 202 as it re-enters Earth's atmosphere. Landing system 208 includes various components such as airbags, parachutes, landing gear, and other suitable types of components.

Docking system 210 is configured to couple spacecraft 202 to structure 204. In particular, docking system 210 is configured to couple docking structure 212 of spacecraft 202 to structure 204. In other words, docking structure 212 connects spacecraft 202 to structure 204. Docking system 108 in FIG. 1 is an example of one implementation for docking system 210 shown in block form in this figure.

In this illustrative example, docking structure 212 may take a number of different forms. For example, without limitation, docking structure 212 is selected from one of a capture ring, a docking base, rods, and other suitable types of structures.

In this depicted example, docking structure 212 is capture ring 216. Capture ring 216 is a circular structural component in this illustrative example. Capture ring 216 may be comprised of various types of materials such as, for example, without limitation, a metal, a metal alloy, or some other suitable type of material that provides a desired level of stiffness.

As depicted, capture ring 216 is an active ring in this illustrative example. In other words, capture ring 216 is configured to be moved relative to structure 204. For instance, docking system 210 moves capture ring 216 toward structure 204 such that capture ring 216 engages with structure 204 in a desired manner.

As illustrated, structure 204 also may take a number of different forms. For instance, structure 204 may be selected from a docking ring, a space station, a satellite, and a spacecraft. In this depicted example, structure 204 is space station 214.

Space station 214 is a spacecraft designed to remain in space for an extended period of time. Space station 214 may not include propulsion systems and landing systems in this illustrative example.

Space station 214 includes passive docking ring 218. Similar to capture ring 216, docking ring 218 is a circular structural component. Docking ring 218 is a passive structure in this illustrative example. In other words, docking ring 218 remains stationary and does not move during docking of spacecraft 202 to structure 204.

As illustrated, capture ring 216 in spacecraft 202 is configured to connect to docking ring 218 in space station 214 to dock spacecraft 202. The docking may be performed to exchange resources between spacecraft 202 and space station 214. Capture ring 216 and docking ring 218 are rings of the same size and shape.

During docking, propulsion system 206 propels spacecraft 202 toward space station 214 for docking. As spacecraft 202 gets closer to space station 214, propulsion system 206 slows down or stops. Docking system 210 with capture ring 216 then extends from spacecraft 202 and aligns with docking ring 218 in space station 214. Capture ring 216 is aligned with docking ring 218 when the mating surface of the capture ring 216 is arranged within a desired distance and with a desired orientation relative to docking ring 218.

When capture ring 216 is within desired distance 215 of docking ring 218 and has desired alignment 217, docking ring 218 and capture ring 216 may be secured to one another to dock spacecraft 202 at space station 214. Desired distance 215 is selected such that an attachment system may be activated to attach docking ring 218 to capture ring 216. Desired alignment 217 is selected such that docking ring 218 and capture ring 216 have an alignment that prevents free motion between docking ring 218 and capture ring 216 when the attachment system is activated.

Figure 3:
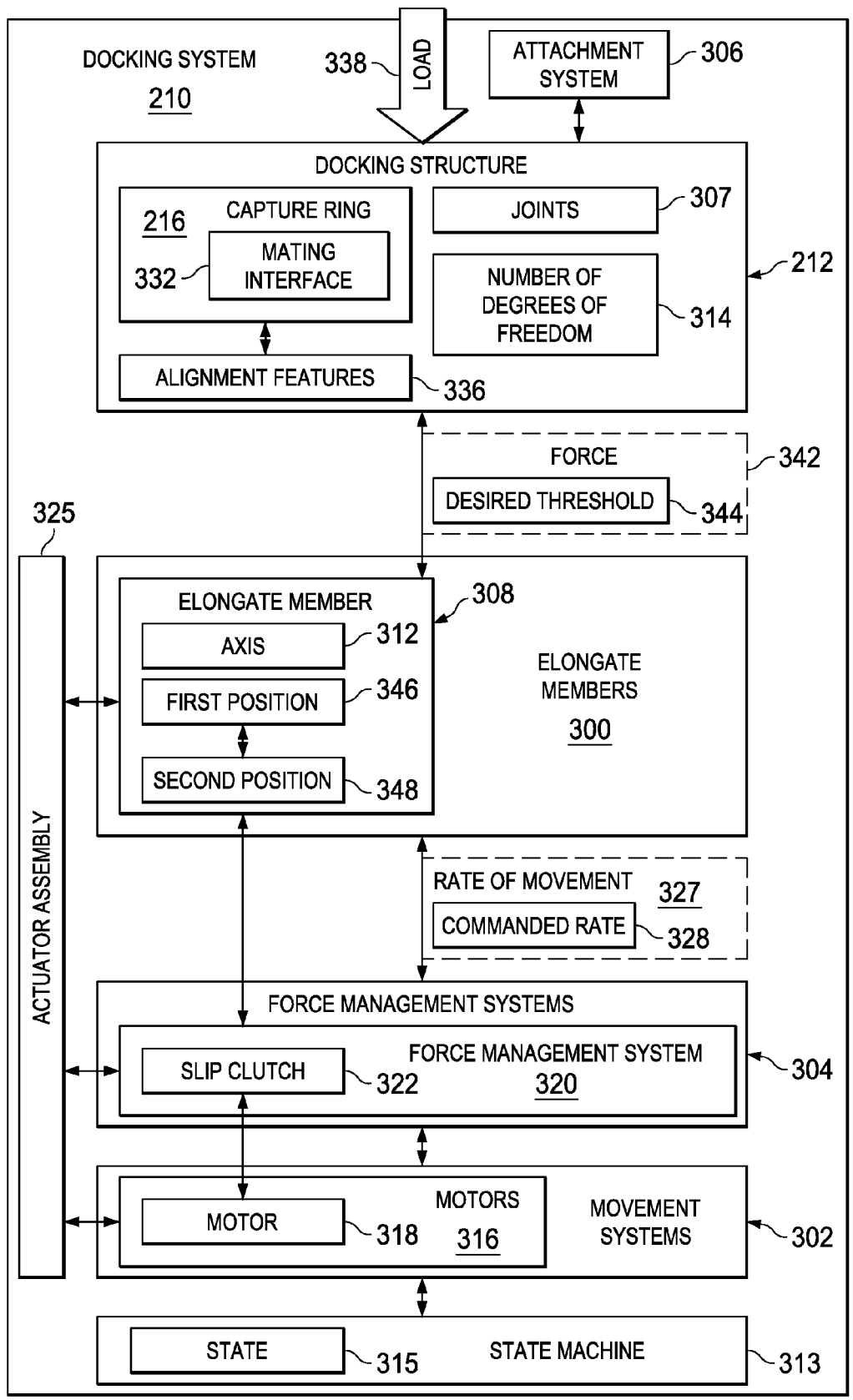
FIG. 3 is an illustration of a block diagram of a docking system for spacecraft in accordance with an illustrative embodiment.

With reference next to FIG. 3, an illustration of a block diagram of a docking system for spacecraft is depicted in accordance with an illustrative embodiment. Examples of components that may be used to implement docking system 210 from FIG. 2 are shown in this figure.

In addition to docking structure 212, docking system 210 includes elongate members 300, movement systems 302, force management systems 304, and attachment system 306. As illustrated, elongate members 300 are structures associated with docking structure 212.

Elongate members 300 may take various forms and may be comprised of various types of materials. For example, elongate members 300 may be selected from at least one of actuator arms, rods, attachments for ball screws, or other suitable types of elongate members. Further, elongate members 300 may be comprised of one or more materials selected from at least one of a metal, a metal alloy, a composite, or some other suitable type of material.

In this illustrative example, elongate members 300 may have a number of different shapes. For instance, elongate members may be cylindrical, hexagonal, octagonal, or have some other shape. In this depicted example, elongate members 300 includes elongate member 308.

As illustrated, elongate members 300 are configured to move axially such that docking structure 212 moves. In this illustrative example, axial movement is movement along an axis extending centrally through each of elongate members 300. For example, axial movement of elongate member 308 is movement along axis 312 extending centrally through elongate member 308. In other words, elongate member 308 moves axially through movement along axis 312.

In this illustrative example, elongate member 308 extends and retracts along axis 312. Elongate members 300 may extend and retract in the x-plane, the y-plane, and the z-plane with the use of joints 307 between elongate members 300 and docking structure 212. In one illustrative example, elongate members 300 are connected in a Stewart platform arrangement to capture ring 216.

As illustrated, elongate members 300 are arranged around capture ring 216 and connected to the lower surface of capture ring 216 at joints 307. Capture ring 216 moves as elongate members 300 move.

Joints 307 are universal joints in this illustrative example. Joints 307 include mechanical couplings that attach docking structure 212 to elongate members 300 such that when docking structure 212 and elongate members 300 are not in line with each other, freedom of movement still occurs.

As elongate members 300 move, docking structure 212 also moves. Accordingly, elongate members 300 and docking system 210 are configured to move in the x-direction, the y-direction, and the z-direction. In particular, elongate members 300 move docking structure 212 with number of degrees of freedom 314. A "number of" items, as used herein, means one or more items. In this illustrative example, number of degrees of freedom 314 is one or more degrees of freedom.

In this illustrative example, number of degrees of freedom 314 refers to the ability of docking structure 212 to move in three-dimensional space. In this illustrative example, docking structure 212 moves with six degrees of freedom. In other words, docking structure 212 is capable of translational motion along the x-axis, y-axis, and z-axis, and rotational motion about the x-axis, y-axis, and z-axis.

In this depicted example, movement systems 302 are configured to move elongate members 300 axially such that docking structure 212 moves with number of degrees of freedom 314. Movement systems 302 comprise motors 316. In this illustrative example, motors 316 are operated by at least one of electric current, hydraulic fluid pressure, pneumatic pressure, or some other suitable source of energy.

In this depicted example, each motor in motors 316 corresponds to a different elongate member in elongate members 300. Each motor in motors 316 moves one elongate member in elongate members 300. For example, motor 318 in motors 316 corresponds to elongate member 308 in elongate members 300. Accordingly, motor 318 is configured to move elongate member 308 axially.

As each elongate member in elongate members 300 is moved, docking structure 212 moves. For example, docking structure 212 may tilt, rotate, move along an axis, or some combination thereof as one or more of elongate members 300 move.

In this depicted example, each of elongate members 300 moves independently of one another using motors 316. Put differently, each of elongate members 300 may be moved in a desired manner regardless of the movement of the other elongate members 300. As a result, docking structure 212 may move with number of degrees of freedom 314.

In this illustrative example, movement systems 302 are configured to operate in state 315 determined by state machine 313. State 315 is a condition of docking system 210 in which docking system 210 operates in a desired manner. State 315 may be selected from at least one of extension, attenuation, retraction, or some other suitable state. Movement systems 302 operate in a different state 315 during different stages of docking.

For example, when state 315 is extension, motors 316 move elongate members 300 and docking structure 212 toward structure 204 in FIG. 2. When state 315 is retraction, motors 316 move elongate members 300 and docking structure 212 toward spacecraft 202, away from structure 204. State 315 of docking system 210 is described in greater detail in FIG. 4.

As illustrated, each of motors 316 is configured to operate such that elongate members 300 have rate of movement 327. Rate of movement 327 is the speed at which a motor moves its corresponding elongate member. In this illustrative example, rate of movement 327 is commanded rate 328. For example, each of motors 316 are configured to operate such that torque generated by motors 316 is translated to axial motion of elongate members 300 at commanded rate 328.

Commanded rate 328 is a pre-determined rate in this illustrated example. In other words, commanded rate 328 does not dynamically change based on a control system for docking system 210. Motors 316 extend elongate members 300 at commanded rate 328, unless resistance is present to oppose extension.

Commanded rate 328 may be the same rate or a different rate for each of elongate members 300 in this illustrative example. For instance, each of motors 316 may be commanded to extend elongate members 300 at one-inch per second. In another illustrative example, motors 316 may be commanded to extend elongate members 300 at a slower or faster rate, depending on the particular implementation.

In this illustrative example, motor 318 moves elongate member 308 at commanded rate 328. Commanded rate 328 does not change based on a control system. Instead, motor 318 is configured to reduce rate of movement 327 of elongate member 308 based on load 338 placed on elongate member 308 by docking ring 218 in FIG. 2 as capture ring 216 touches docking ring 218. In this manner, rate of movement 327 slows as the size of load 338 increases.

As depicted, force management systems 304 connect movement systems 302 to elongate members 300. Force management systems 304 are mechanical devices that provide for the transmission of power from one component to another component. The power transferred by force management systems 304 is torque generated by motors 316.

Force management systems 304 may take a number of different forms. For example, without limitation, force management systems 304 may be selected from at least one of a slip clutch, a hydraulic clutch, an electromagnetic clutch, an electromagnetic motor, software, an electronic controller, or some other suitable type of device that can limit the force transmission.

Force management systems 304 correspond to motors 316 and elongate members 300. In other words, one of force management systems 304, motors 316, and elongate members 300 form an operational component of docking system 210. In this depicted example, the operational component of docking system 210 is actuator assembly 325. Actuator assembly 325 may be a linear actuator in this illustrative example. Actuator assembly 325 includes elongate member 308, motor 318, force management system 320, and other components (not shown in this view).

In this illustrative example, force management systems 304 transfer power from movement systems 302 to elongate members 300 to move elongate members 300 as desired. In transferring power from movement systems 302 to elongate members 300, force management systems 304 limits force 342 applied by each of elongate members 300 to desired threshold 344 during movement of each of elongate members 300. Force 342 is based on the torque supplied by each of motors 316. Force 342 opposes load 338 applied by docking ring 218.

As depicted, desired threshold 344 may be a maximum force for each of elongate members 300 to exert on docking ring 218 of space station 214 from FIG. 2. Desired threshold 344 is a pre-determined value in this illustrative example. In an illustrative example, desired threshold 344 is ten pounds of force. In other illustrative examples, desired threshold 344 may be one pound of force, three pounds of force, twenty pounds of force, or some other suitable value.

In this depicted example, force management systems 304 include force management system 320. Force management system 320 connects motor 318 to elongate member 308 and transfers power from motor 318 to elongate member 308 such that elongate member 308 moves. Force management system 320 limits force 342 applied by elongate member 308 to desired threshold 344 in this illustrative example.

As illustrated, force management system 320 is slip clutch 322. Slip clutch 322 is a device that limits torque transmission, or "slips," if it reaches a higher level of torque than it is designed to transmit. Slip clutch 322 is a passive device in this illustrative example. In other words, slip clutch 322 is a mechanical component that does not change its behavior in response to a signal sent by a control system.

Slip clutch 322 controls force 342 by controlling the torque of motor 318 in this illustrative example. Slip clutch 322 is configured to slip when force 342 reaches desired threshold 344 such that elongate member 308 moves from first position 346 to second position 348 while continuing to transmit force 342 at desired threshold 344.

In this depicted example, first position 346 is a length of elongate member 308 when force 342 reaches desired threshold 344. Second position 348 is a length of elongate member 308 after the slipping of slip clutch 322 occurs and force 342 has dropped below desired threshold 344.

In this illustrative example, docking structure 212 comprises mating interface 332 and alignment features 336. Mating interface 332 is the upper surface of capture ring 216 in this illustrative example. Mating interface 332 is a portion of capture ring 216 that engages with docking ring 218 of space station 214 in FIG. 2.

As illustrated, alignment features 336 are structural components mounted to capture ring 216. Alignment features 336 are arranged along capture ring 216.

In this illustrative example, alignment features 336 may be comprised of various types of materials and have a number of different shapes. For instance, alignment features 336 may be comprised of a metal, a metal alloy, or other suitable types of materials and combinations of materials. Alignment features 336 may be triangular, rectangular, or have some other suitable shape. Alignment features 336 may be referred to as "petals" in some illustrative examples.

As depicted, alignment features 336 are configured to guide and align docking system 210 of spacecraft 202 with docking ring 218 in space station 214. As spacecraft 202 and space station 214 meet, alignment features 336 position spacecraft 202 and space station 214 relative to one another.

In this illustrative example, attachment system 306 from FIG. 3 is configured to secure docking structure 212 to structure 204. Attachment system 306 may include various components configured to attach docking structure 212 to structure 204. For example, without limitation, attachment system 306 may include a latch, a lock, electromagnets, or some other device to maintain a connection between capture ring 216 and docking ring 218.

In coupling spacecraft 202 with space station 214, motors 316 move elongate members 300 axially such that capture ring 216 for spacecraft 202 moves. This movement occurs at commanded rate 328 for each actuator assembly in docking system 210.

As docking system 210 extends in the direction of docking ring 218 in space station 214, mating interface 332 of capture ring 216 engages with docking ring 218 at one or more points along capture ring 216. Elongate members 330 and capture ring 216 apply force 342 to docking ring 218.

In response, docking ring 218 applies load 338 to capture ring 216 at the points along capture ring 216 that have interfaced with docking ring 218. For example, capture ring 216 may interface with docking ring 218 at a point near the joint of capture ring 216 and elongate member 308.

As docking ring 218 applies load 338 to capture ring 216 at that point, the extension of elongate member 308 slows. The other elongate members 300 continue to move at commanded rate 328 until the elongate members 300 interface with various points along docking ring 218 and slow down as load 338 is applied to capture ring 216 by docking ring 218. In other words, load 338 applied to capture ring 216 by docking ring 218 determines force 342 applied by elongate members 300 to capture ring 216. In this manner, actuator assembly 325 operates independently of the other actuator assemblies in docking system 210.

In this illustrative example, alignment features 336 align capture ring 216 with respect to docking ring 218. As docking system 210 extends toward space station 214, state 315 is extension.

When capture ring 216 and docking ring 218 are aligned in a desired manner, attachment system 306 secures capture ring 216 to docking ring 218. State 315 for docking system 210 is captured at this point in time.

Once attachment system 306 is activated to secure capture ring 216 to docking ring 218, state 315 changes to attenuation. During attenuation, force 342, applied by each of elongate members 300, is adjusted using force management systems 304. In particular, settings for force management systems 304 are adjusted based on load 338. For example, when force 342, applied by elongate member 308 to docking ring 218, reaches desired threshold 344, slip clutch 322 limits the transmission of torque.

Load 338 at this point in time may be greater than force 342 applied by elongate member 308. As a result, elongate member 308 can shorten from first position 346 to second position 348 while slip clutch 322 limits transmission force by elongate member 308. The process continues in this manner until capture ring 216 and docking ring 218 no longer move relative to one another, within selected tolerances.

In this manner, force management systems 304 passively limit force 342 applied by each of elongate members 300 in response to load 338 applied by docking ring 218 of space station 214. In other words, the control of docking system 210 is mechanical in this illustrative example and occurs without intervention from an electronic control system, control laws, or software applications in spacecraft 202, space station 214, or a combination thereof. As a result, docking of spacecraft 202 with space station 214 occurs without increasing the weight or complexity of spacecraft 202 with docking system 210. Additionally, complications with docking system 210 and its mechanical components may be less likely to occur than with some currently used software-based systems.

The illustration of docking system 210 in FIG. 2 and FIG. 3 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, docking ring 218 in space station 214 in FIG. 2 also may be an active structure. In this instance, both capture ring 216 and docking ring 218 may move relative to one another to align spacecraft 202 and space station 214 in a desired manner.

In other illustrative examples, docking structure 212 may take other forms other than capture ring 216. For example, without limitation, docking structure 212 may be a rod configured to interface with a cone structure on space station 214.

In still other illustrative examples, force management system 320 may be a program configured to control motor 318 in actuator assembly 325. For example, torque transmitted by motor 318 may be limited by electronic circuitry instead of slip clutch 322.

Figure 4:
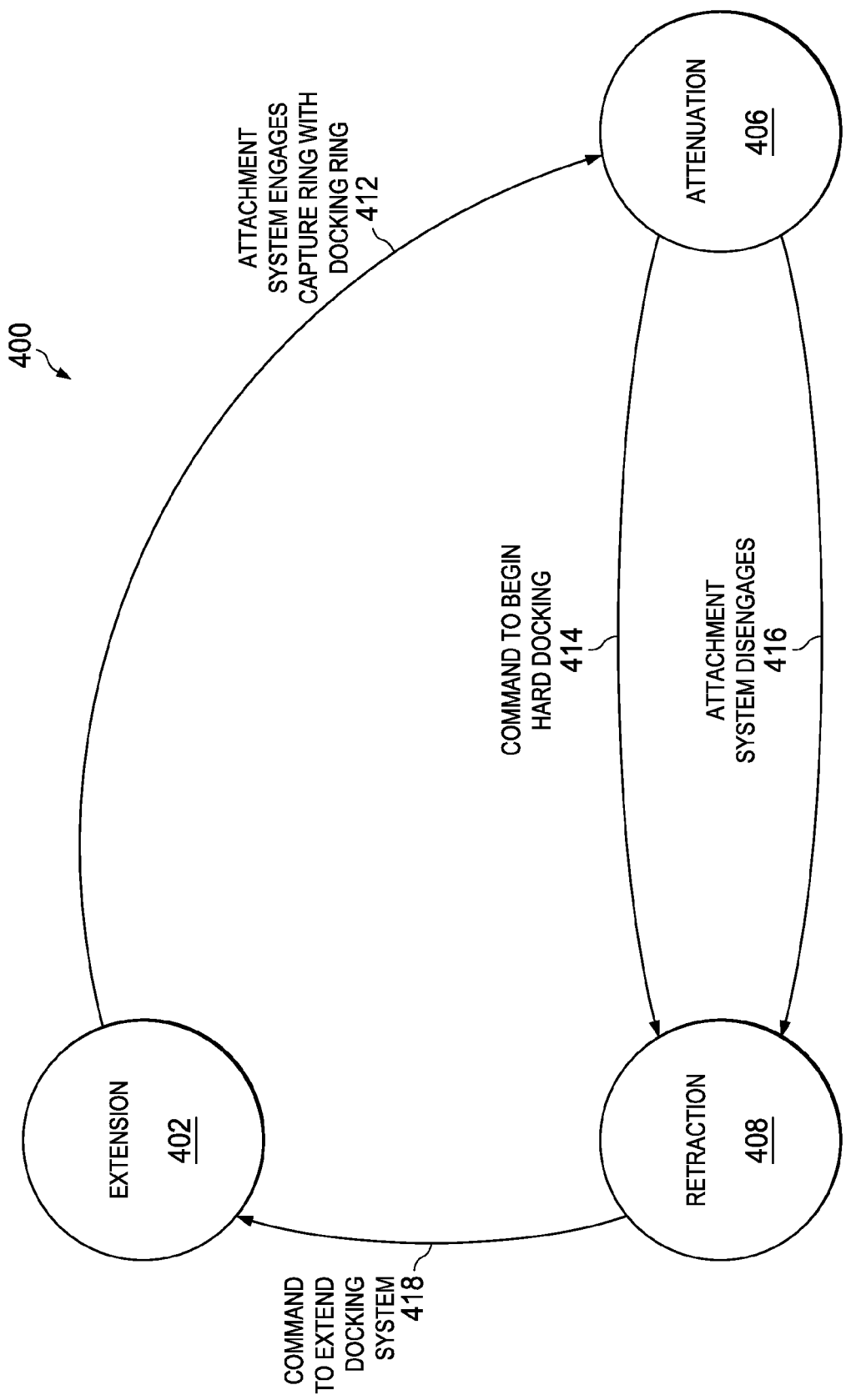
FIG. 4 is an illustration of a state diagram of changes between states of operation of a movement system in accordance with an illustrative embodiment.

Turning now to FIG. 4, an illustration of a state diagram of changes between states of operation of a movement system is depicted in accordance with an illustrative embodiment. In this depicted example, state machine 400 illustrates an example of one implementation of conditions for changes of state 315 of motors 316 in docking system 210 from FIG. 3. State machine 400 is an example of an implementation of the state machine 313 in FIG. 3.

In this illustrative example, state machine 400 has different states that may occur during the operation of motors 316. For example, state machine 400 includes extension state 402, attenuation state 406, and retraction state 408. In particular, these different states are examples of state 315 that may occur for motor 318.

Figure 11:
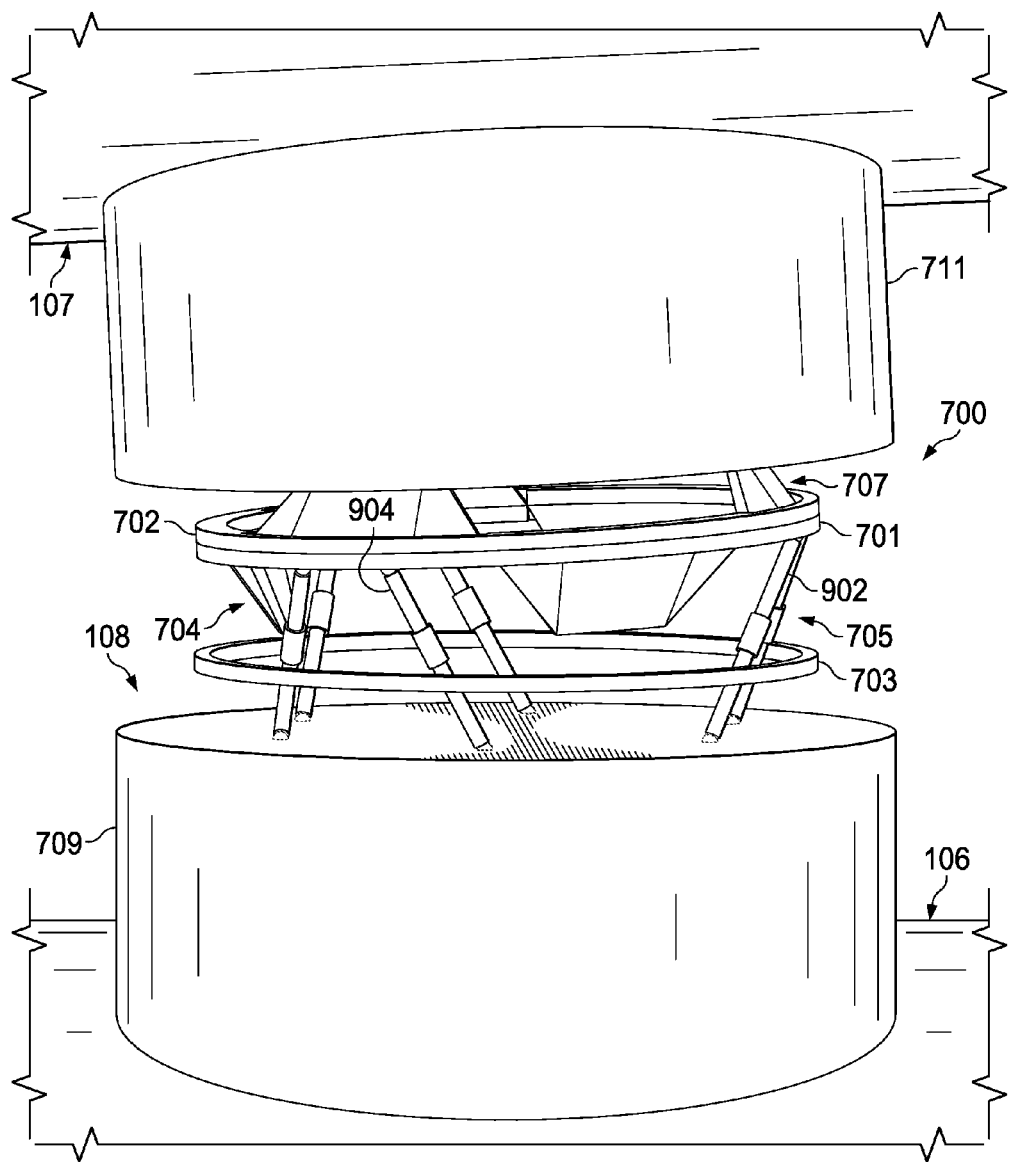
FIG. 11 is still another illustration of a docking system aligning with a second structure in accordance with an illustrative embodiment.

In extension state 402, capture ring 216 starts from a ready-to-dock position, with capture ring 216 extending to align with docking ring 218, as described with respect to FIG. 11. Slip clutch 322 in FIG. 3 is set to a low slippage force in extension state 402.

Alignment features 336 on capture ring 216 and alignment features on docking ring 218 align the two rings with respect to one another. Each of the actuator assemblies in docking system 210 adjusts its position independently to allow capture ring 216 to become aligned relative to docking ring 218.

When the capture ring is aligned and within a desired distance from the docking ring, the attachment system is deployed. In this illustrative example, the desired distance may be three millimeters. The desired distance may be determined using a sensor system arranged along the docking ring, or in some other suitable manner, depending on the particular implementation.

In this illustrative example, attachment system 306 in docking system 210 engages with body latches on docking ring 218. In some illustrative examples, attachment system 306 may include magnetic latches on capture ring 216, docking ring 218, or both.

In this depicted example, operation of motors 316 shift to attenuation state 406 after the attachment system engages the capture ring with the docking ring (event 412). Slip clutch 322 switches to a higher slippage force in attenuation state 406. In attenuation state 406, free play exists between capture ring 216 and docking ring 218. In this illustrative example, free play is five millimeters. Attenuation state 406 occurs automatically in response to the attachment system connecting capture ring 216 and docking ring 218.

Figure 13:
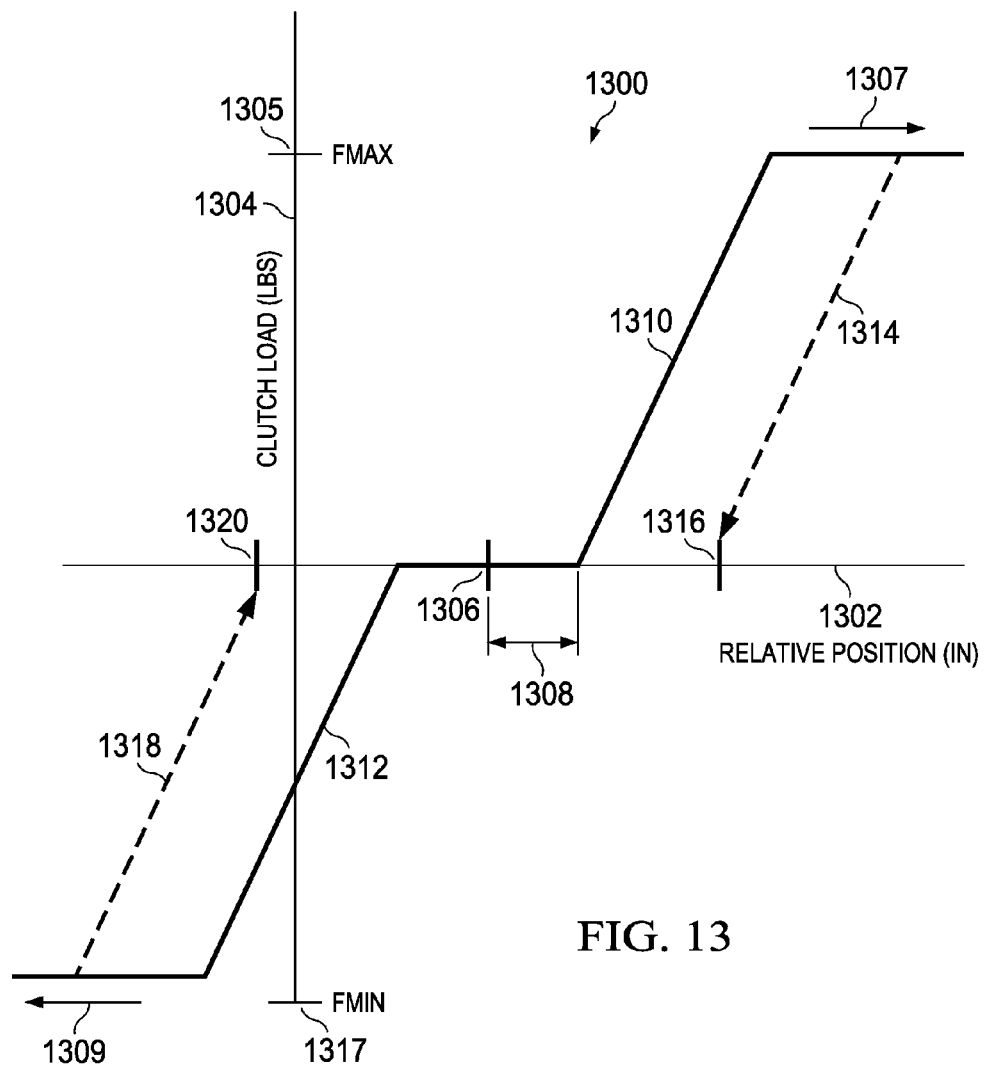
FIG. 13 is an illustration of a graph of a docking system in attenuation mode in accordance with an illustrative embodiment.

In attenuation state 406, each of motors 316 behave in the manner described in FIG. 13. As a result, forces applied by the actuator assemblies within docking system 210 cause relative motion between spacecraft 202 and space station 214 to be reduced or eliminated.

The operation of motors 316 may be changed to retraction state 408 in response to a number of conditions. For example, the operation of motors 316 is changed to retraction state 408 when it is no longer desired for the capture ring to be attached to the docking ring and attachment system disengages (event 416).

In another illustrative example, the operation of motors 316 is changed to retraction state 408 when the docking system receives a command to begin hard docking (event 414). In this instance, retraction state 408 is used to bring spacecraft 202 and space station 214 closer together such that a tunnel may be attached and pressurized. Thereafter, resources can be exchanged between spacecraft 202 and space station 214. During retraction state 408, the actuator assemblies retract towards a stowed position.

In some illustrative examples, motors 316 may operate in other states not shown in state machine 400. For example, without limitation, motors may operate in an alignment state. In the alignment state, motors 316 are commanded to extend elongate members 300 to a common length, which could be the maximum length, or some other common length. In this state, the system is preparing for transition to retraction state 408, which draws the two vehicles together along the axial direction, bringing them together in preparation for hard-docking, where a separate system pulls the two docking structures together firmly to create a rigid structural connection. In some examples, a pressurized connection is achieved.

The illustration of the different states in state machine 400 is not meant to limit the manner in which state machine 400 may be implemented. State machine 400 may include other states in addition to or in place of the ones depicted. For example, state machine 400 also may include a manual operation mode, extension to "ready-for-capture" mode, a position hold mode, and maybe others.

Figure 5:
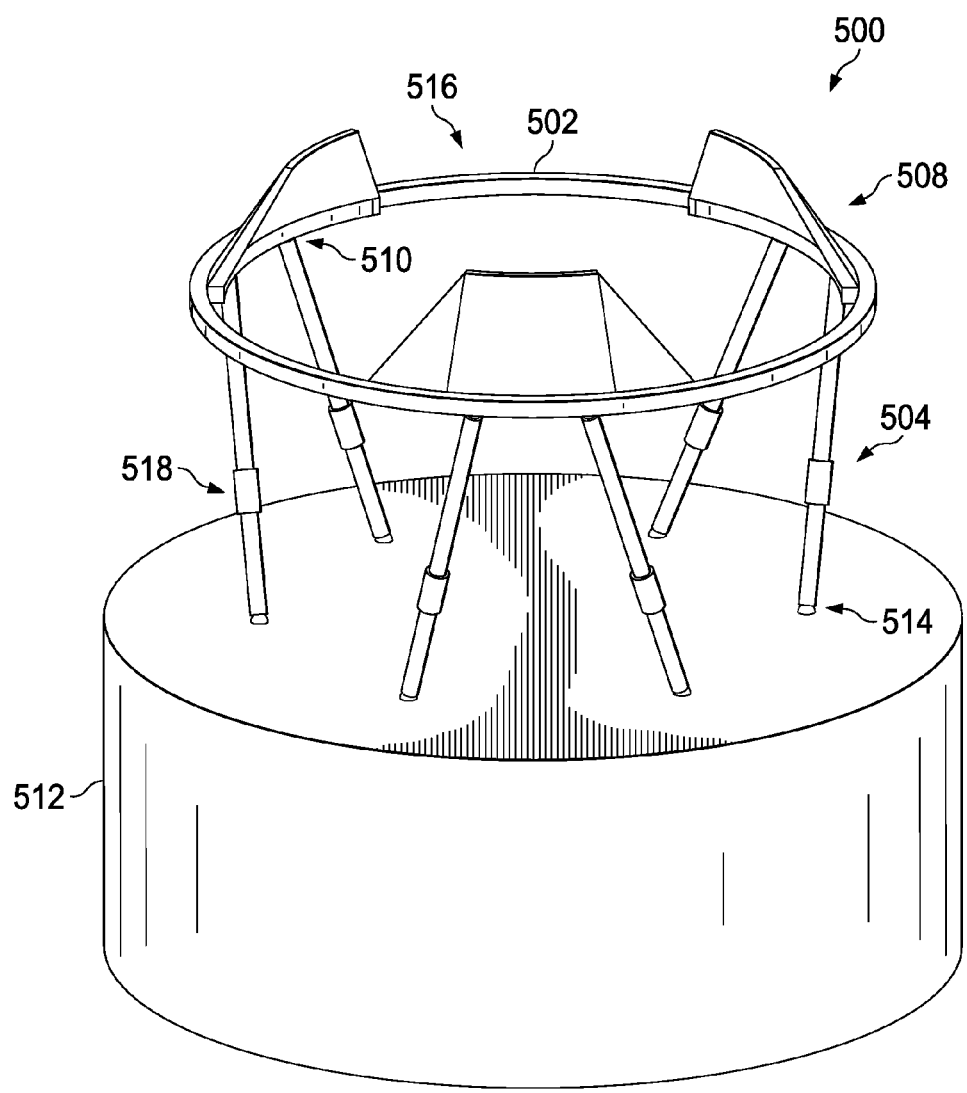
FIG. 5 is an illustration of a docking system for spacecraft in accordance with an illustrative embodiment.

With reference next to FIG. 5, an illustration of a docking system for spacecraft is depicted in accordance with an illustrative embodiment. In this depicted example, docking system 500 is an example of one implementation for docking system 210 shown in block form in FIG. 3.

As depicted, docking system 500 comprises capture ring 502, actuator assemblies 504, and alignment features 508. Actuator assemblies 504 are examples of implementations for actuator assembly 325 shown in block form in FIG. 3. Actuator assemblies 504 are connected to capture ring 502 at joints 510.

Actuator assemblies 504 are also connected to base plate 512 in this illustrative example. Base plate 512 is a stationary structure attached to a spacecraft. For example, base plate 512 may be a platform attached to spacecraft 102 to provide stability for docking system 108 in FIG. 1. Although base plate 512 has a circular shape in this illustrative example, base plate 512 may have a different shape. In other examples, base plate 512 may be part of a skin panel of spacecraft 102, instead of a separate platform as shown in this figure.

Actuator assemblies 504 are connected to base plate 512 at joints 514. Joints 510 and joints 514 are universal joints in this illustrative example. As a result, capture ring 502 may move with six degrees of freedom.

In this illustrative example, alignment features 508 are positioned along mating interface 516 of capture ring 502 and configured to align capture ring 502 with a second structure, such as docking ring 218 from FIG. 2. Alignment features 508 comprise three petals in this illustrative example. Other numbers of petals may be present in other illustrative examples.

Although not shown in this view, alignment features 508 may be arranged at an angle with respect to capture ring 502. In other words, alignment features 508 may be angled inward in some illustrative examples. In other illustrative examples, alignment features 508 may have a different orientation, depending on the particular implementation. For example, one or more of alignment features may be tilted outward.

As depicted, actuator assemblies 504 comprise a number of housings 518. Housings 518 are configured to protect the components within actuator assemblies 504, including motors, clutches, gears, and other components. Housings 518 are comprised of metal in this illustrative example, but also may be comprised of a different type of material with desired structural properties for protecting the functional components of actuator assemblies 504. Each of actuator assemblies 504 moves independently, as described above.

Figure 6:
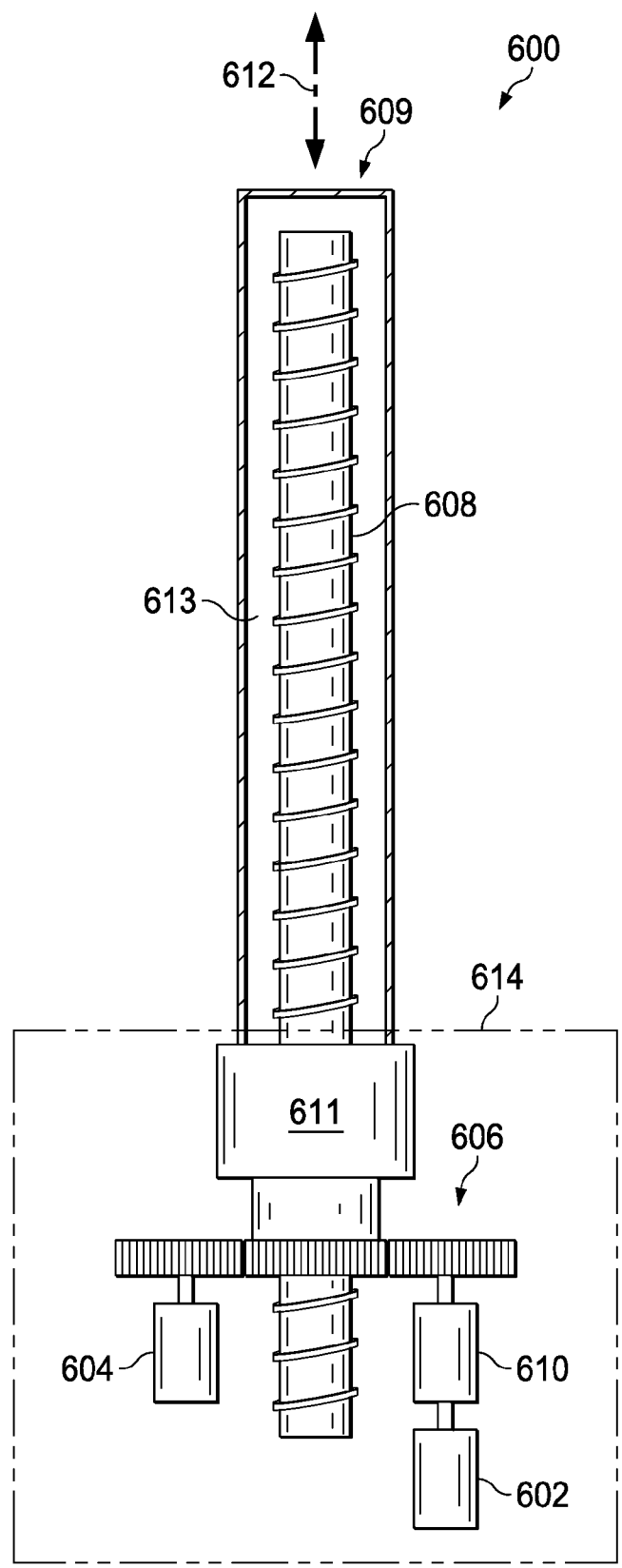
FIG. 6 is an illustration of an actuator assembly in accordance with an illustrative embodiment.

Turning next to FIG. 6, an illustration of an actuator assembly is depicted in accordance with an illustrative embodiment. In this depicted example, actuator assembly 600 is one example of an implementation for actuator assembly 325 comprising elongate member 308, motor 318, and slip clutch 322 shown in block form in FIG. 3. Actuator assembly 600 is also an example of a functional component used in docking system 500 shown in FIG. 5. Actuator assembly 600 is an example of one implementation for an actuator assembly in actuator assemblies 504 in FIG. 5.

As depicted, actuator assembly 600 includes motor 602, brake 604, gears 606, ball screw 608, slip clutch 610, ball nut 611, and sliding tube 613. Actuator assembly 600 is a linear actuator in this illustrative example. In other words, actuator assembly 600 creates motion in a straight line along axis 612 that extends centrally through actuator assembly 600. In other illustrative examples, actuator assembly 600 may be some other type of actuator, depending on the functionality involved.

In this depicted example, motor 602 is an example of one implementation for motor 318 in FIG. 3. Motor 602 is configured to move ball nut 611 rotationally. As motor 602 applies torque, gears 606 turn to rotate ball nut 611. Sliding tube 613 is attached to ball nut 611. As ball nut 611 rotates about its axis, ball nut 611 moves in its axial direction since the grooves in ball screw 608 continuously provide helical form. As ball nut 611 moves axially, sliding tube 613 also moves. In other words, sliding tube 613 is configured to extend and retract based on power provided by motor 602.

End 609 of sliding tube 613 may be attached directly to capture ring 502 from FIG. 5. In other examples, ball screw 608 may be directly attached to capture ring 502. In this illustrative example, brake 604 is a mechanical component configured to inhibit motion of actuator assembly 600. The brake 604 is used to prevent motion of actuator assembly 600 when power to actuator assembly 600 is removed.

Slip clutch 610 is one example of an implementation for slip clutch 322 shown in block form in FIG. 3. Slip clutch 610 connects motor 602 to ball screw 608 and is configured to limit a force applied by ball screw 608 to a desired threshold during movement of ball screw 608.

Slip clutch 610 is configured to passively limit the force applied by ball screw 608 in response to a load applied by a second structure. Slip clutch 610 is configured to slip when the force reaches the desired threshold such that sliding tube 613 moves from a first position to a second position.

One or more of the components shown in actuator assembly 600 are positioned within housing 614. Housing 614 is an example of one of housings 518 shown in docking system 500 in FIG. 5. Housing 614 is shown in phantom in this figure. As illustrated, motor 602, brake 604, gears 606, and slip clutch 610 are positioned within the interior of housing 614.

The illustrations of docking system 500 in FIG. 5 and actuator assembly 600 in FIG. 6 are examples of a physical implementation of docking system 210 shown in block form in FIG. 2. These illustrations are not meant to imply physical or architectural limitations to the manner in which an illustrative embodiment may be implemented. Other components in addition to or in place of the ones illustrated may be used. Some components may be optional.

The different components shown in FIG. 5 and FIG. 6 may be illustrative examples of how components shown in block form in FIG. 2 and FIG. 3 can be implemented as physical structures. Additionally, some of the components in FIG. 5 and FIG. 6 may be combined with components in FIG. 2 and FIG. 3, used with components in FIG. 2 and FIG. 3, or a combination of the two.

For instance, in some illustrative examples, ball screw 608 may be directly connected to capture ring 502 in FIG. 5. In this case, sliding tube 613 is unnecessary. In other illustrative examples, ball nut 611 may apply a force directly to capture ring 502 to move capture ring 502 in a desired manner.

Figure 7:
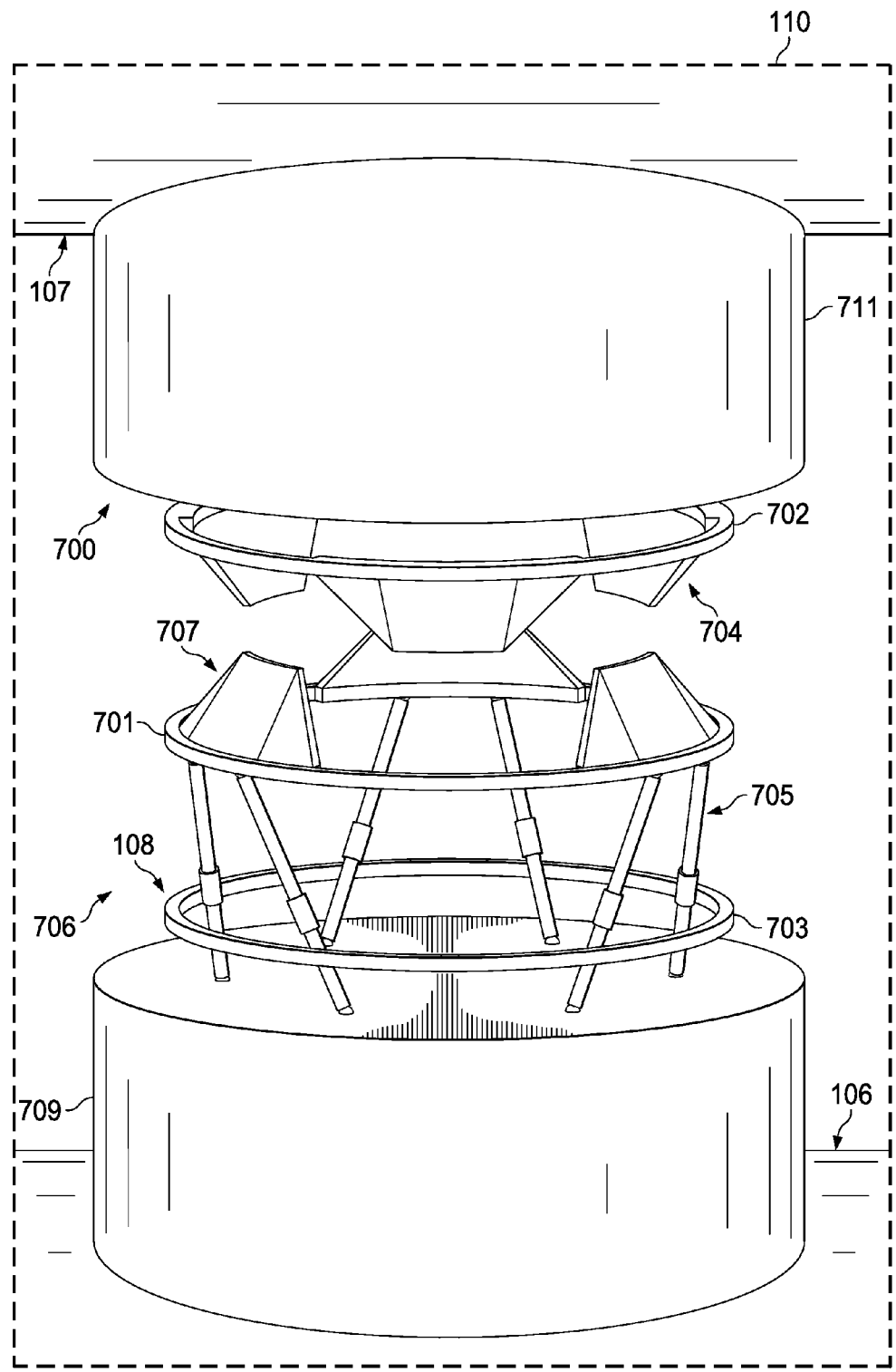
FIG. 7 is an illustration of a docking system engaging with a second structure in accordance with illustrative embodiment.

Referring now to FIG. 7, an illustration of a docking system engaging with a second structure is depicted in accordance with an illustrative embodiment. In this depicted example, a more detailed illustration of section 110 from FIG. 1 is shown. Docking system 108 for space shuttle 106 is in position to engage with docking system 700 for space station 107 in this illustrative example. Docking system 700 does not move in this illustrative example. However, in other illustrative examples docking system 700 may move.

As illustrated, docking system 108 for space shuttle 106 includes capture ring 701, base ring 703, actuator assemblies 705, alignment features 707, and base plate 709. In this illustrative example, base ring 703 is a structural component that provides a stopping point for retraction of capture ring 701.

Docking system 700 for space station 107 includes docking ring 702, alignment features 704, and base plate 711. Docking ring 702 is an example of one implementation for docking ring 218 shown in block form in FIG. 2. Alignment features 704 guide docking ring 702 to interface with capture ring 701. Alignment features 704 are arranged along docking ring 702 and are angled inward in this illustrative example.

In this depicted example, docking system 108 is shown in ready-to-dock position 706. Ready-to-dock position 706 indicates that docking system 108 is extended such that alignment features 707 may engage with alignment features 704. Docking system 108 aligns with docking system 700 using alignment features 707 and alignment features 704 as guides.

FIGS. 8-11 illustrate the movement of docking system 108 during various stages of docking. The process illustrated in FIGS. 8-18 provides only one example of the manner in which an illustrative embodiment may be implemented.

Figure 8:
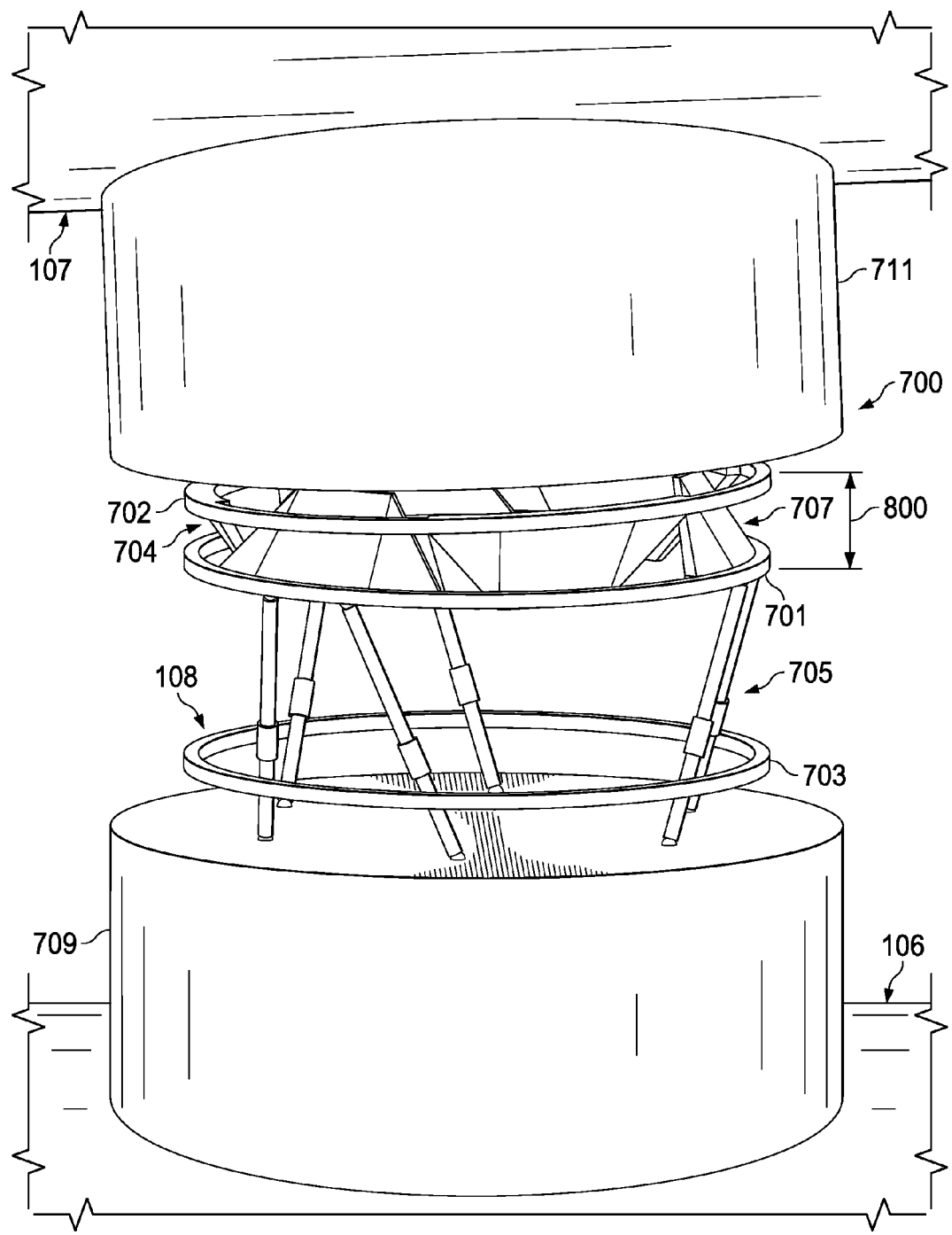
FIG. 8 is another illustration of a docking system aligning with a second structure in accordance with an illustrative embodiment.

Turning to FIG. 8, another illustration of a docking system aligning with a second structure is depicted in accordance with an illustrative embodiment. In this illustrative example, docking system 108 is in the extension state. In other words, state 315 from FIG. 3 for docking system 108 is extension. During extension, the elongate members within actuator assemblies 705 in docking system 108 are extending toward docking ring 702.

During extension, the elongate members extend at a commanded rate until capture ring 701 engages with docking ring

702. Distance 800 is present between capture ring 701 and docking ring 702 in this illustrative example.

As shown in this view, capture ring 701 is not aligned with docking ring 702. Accordingly, the position of capture ring 701 needs to be adjusted. Contact forces between components within docking system 108 and docking system 700 align capture ring 701 with docking ring 702. In particular, alignment features 707 and alignment features 704 move capture ring 701 in line with docking ring 702.

Figure 9:
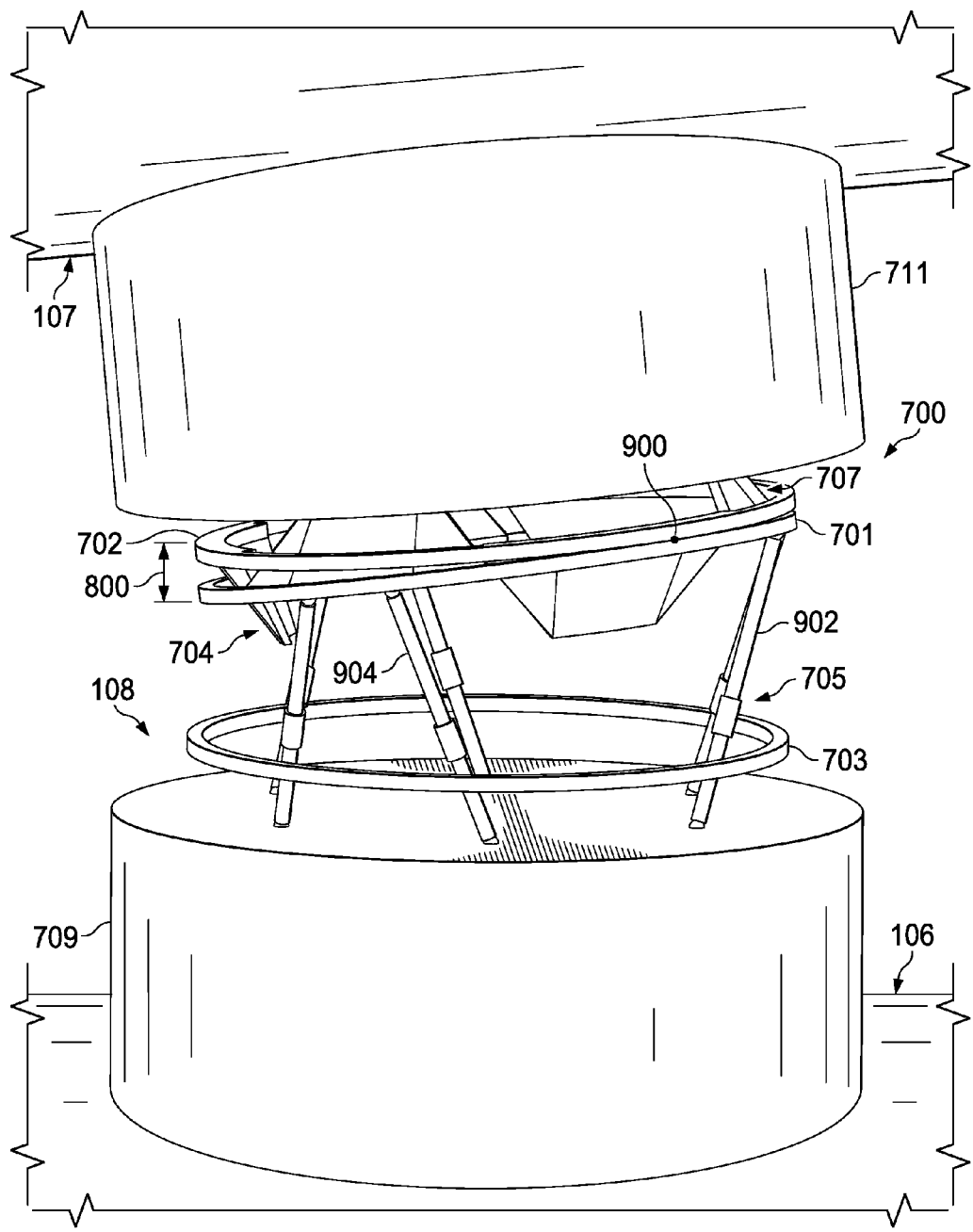
FIG. 9 is another illustration of a docking system aligning with a second structure in accordance with an illustrative embodiment.

In FIG. 9, another illustration of a docking system aligning with a second structure is depicted in accordance with an illustrative embodiment. In this depicted example, distance 800 is smaller than in FIG. 7.

Alignment features 707 on capture ring 701 and alignment features 704 on docking ring 702 have further aligned the two structures in a desired manner. In this illustrative example, a portion of capture ring 701 will interface with docking ring 702 before the rest of capture ring 701, in a clearly misaligned state. Capture ring 701 and docking ring 702 cannot properly attach if a misalignment is present. Therefore, docking system 108 will need adjustment to bring capture ring 701 into the desired aligned condition relative to docking ring 702, for docking.

As illustrated, capture ring 701 first touches docking ring 702 at point 900. When capture ring 701 touches docking ring 702, a load is applied to capture ring 701 by docking ring 702. The load causes the rate of extension of the corresponding elongate members in actuator assemblies 705 to slow.

In this illustrative example, elongate member 902 and elongate member 904 are closest to point 900. Accordingly, the rate of extension for elongate member 902 and elongate member 904 will slow based on the resistance encountered from docking ring 702 to capture ring 701. The other elongate members in docking system 108 continue to extend at the commanded rate until those elongate members encounter resistance.

If the resistance encountered by the elongate members is more than a specified limit, the elongate members will fail to extend further. Otherwise, the elongate members will continue to extend, but at a slower rate than the commanded rate.

Figure 10:
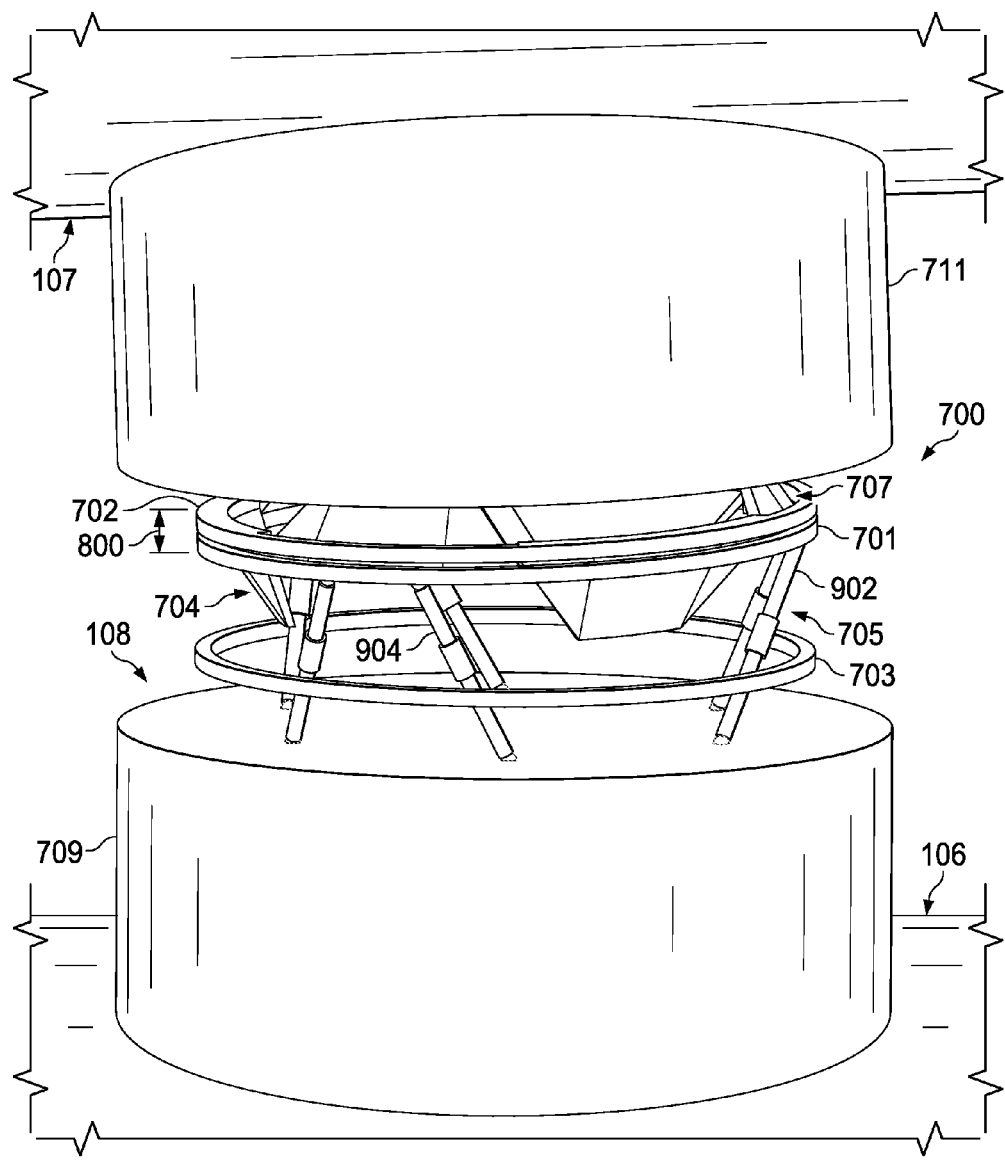
FIG. 10 is yet another illustration of a docking system aligning with a second structure in accordance with an illustrative embodiment.

With reference to FIG. 10, yet another illustration of a docking system aligning with a second structure is depicted in accordance with an illustrative embodiment. In this illustrative example, elongate member 902 and elongate member 904 have been forced to retract based on the resistance encountered by capture ring 701 when touching docking ring 702 at point 900 in FIG. 9.

As seen in this view, distance 800 between capture ring 701 and docking ring 702 is substantially uniform. This alignment allows capture ring 701 and docking ring 702 to interface in a desired manner such that substantially all of the mating surface of capture ring 701 is flush to the mating surface of docking ring 702. Elongate members in actuator assemblies 705 continue to extend in order to completely remove the remaining misalignment of the two rings.

With reference to FIG. 11, still another illustration of a docking system aligning with a second structure is depicted in accordance with an illustrative embodiment. In this depicted example, the mating surface of capture ring 701 has interfaced with the mating surface of docking ring 702.

Capture ring 701 and docking ring 702 may now be secured to one another using an attachment system (not shown). The attachment system may be a latch system in this illustrative example. In response to the positive connection of the two rings using the attachment system, state 315 shown in block form in FIG. 3 changes to attenuation to eliminate remaining relative vehicle motion of space shuttle 106 relative to space station 107 using docking system 108.

Figure 12:
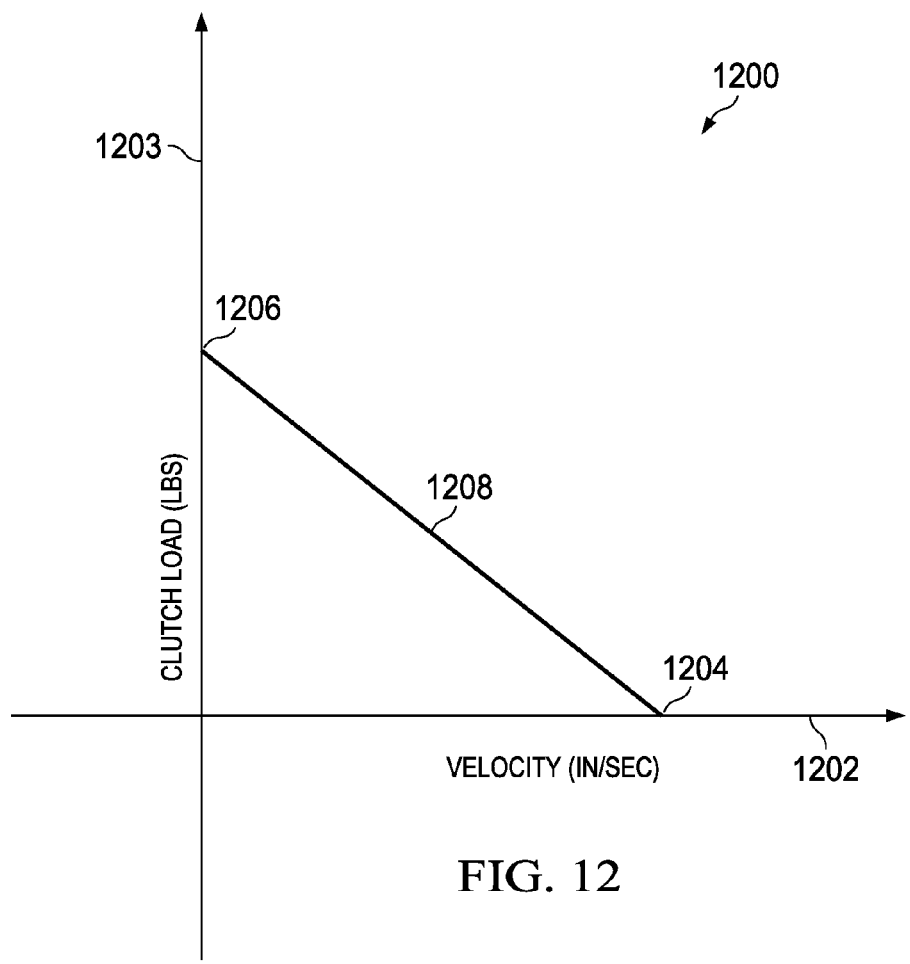
FIG. 12 is an illustration of a graph of a docking system in extension in accordance with an illustrative embodiment.

In FIG. 12, an illustration of a graph of a docking system in extension is depicted in accordance with an illustrative embodiment. In this illustrative example, graph 1200 illustrates a force-velocity curve. Graph 1200 shows the behavior of an actuator assembly in docking system 108 in FIG. 7. This behavior is present for each of the actuator assemblies in docking system 108 in FIG. 7.

As depicted, graph 1200 has x-axis 1202 and y-axis 1203. X-axis 1202 represents velocity of an actuator in docking system 108 in inches-per second, while y-axis 1203 represents the resistance encountered by the actuator in pounds. Velocity for each actuator assembly is pre-determined to be a commanded rate. The commanded rate is one inch-per-second in this illustrative example.

When the actuator assembly encounters zero resistance, the actuator assembly lengthens at the commanded rate, as shown at point 1204 in graph 1200. The actuator also may have a resistance threshold in this illustrative example. The resistance threshold is the maximum amount of force the actuator assembly is permitted to apply, occurring when the actuator assembly is externally prevented from extending at all.

At point 1206 in graph 1200, the actuator assembly is at the resistance threshold. Accordingly, velocity for the actuator assembly is zero. Line 1208 represents the behavior of the actuator assembly between point 1204 and point 1206 in graph 1200.

If the resistance applied to the actuator assembly exceeds the resistance threshold, the velocity becomes negative. In other words, the actuator assembly will retract, or shorten, based on the amount of resistance encountered by the actuator. In this manner, each actuator assembly in docking system 108 behaves passively and independently during extension of docking system 108.

Referring next to FIG. 13, an illustration of a graph of a docking system in attenuation mode is depicted in accordance with an illustrative embodiment. In this illustrative example, graph 1300 illustrates the relative position of the actuator assembly based on the force applied to the clutch corresponding to the actuator. Graph 1300 shows the behavior of each actuator assembly in docking system 108 in FIG. 7.

In this depicted example, graph 1300 has x-axis 1302 and y-axis 1304. X-axis 1302 represents the relative position of the elongate member in the actuator assembly in inches. In other words, the length of the actuator assembly is shown along x-axis 1302.

As illustrated, y-axis 1304 represents a clutch load in pounds. A clutch load threshold is identified as Fmax 1305 in this illustrative example. The clutch load threshold, Fmax 1305, is the maximum amount of force that the clutch will withstand without slippage. Fmax 1305 is a pre-determined value in this illustrative example. When clutch load reaches Fmax 1305, the clutch is configured to slip.

In this illustrative example, position 1306 represents the current length of the actuator assembly. Free play 1308 is the distance that the actuator assembly can lengthen or shorten due to mechanical free play in gears and joints, also commonly referred to as "backlash."

In this depicted example, the actuator assembly resists leaving position 1306 once past the free play 1308. As the clutch load increases, the position of the actuator assembly changes in response to the increasing load. Line 1310 and line 1312 are stiffness curves that show that there is a proportional displacement of an actuator assembly as a function of the compression or tension load applied. When the load reaches the slippage load, the actuator assembly will not resist with increasing load, but slip with a constant resistance.

When clutch load reaches Fmax 1305, the clutch slips, while continuing to resist at a load of Fmax 1305, and slippage occurs until the actuator no longer faces resistance by docking ring 702. In this case, slippage is indicated by arrow 1307 in graph 1300. As a result, clutch load decreases. Line 1314 represents one example of a decreasing clutch load. Position 1316 is a new position for the actuator assembly, representing the new lengthened state of the actuator assembly after slippage occurs. The actuator assembly now resists movement from position 1316 in the same manner as described above.

A similar result occurs in the opposite direction. When the clutch load reaches Fmin 1317, slippage occurs until the clutch load magnitude is decreased. In this case, slippage is indicated by arrow 1309 in graph 1300. Line 1318 represents one example of a decreasing clutch load magnitude. Position 1320 is a new position for the actuator assembly, representing the new shortened length of the actuator assembly after slippage occurs. The actuator assembly now resists movement from position 1320.

The attenuation process, as described in this figure, will occur one or more times during the attenuation state until the clutch load no longer reaches either Fmax 1305 or Fmin 1317 and therefore, no slippage occurs. In this manner, docking system 108 is configured to attenuate forces and absorb remaining relative vehicle energy between space shuttle 106 and space station 107. Each actuator assembly moves independently using the attenuation process described in this figure.

Figure 14:
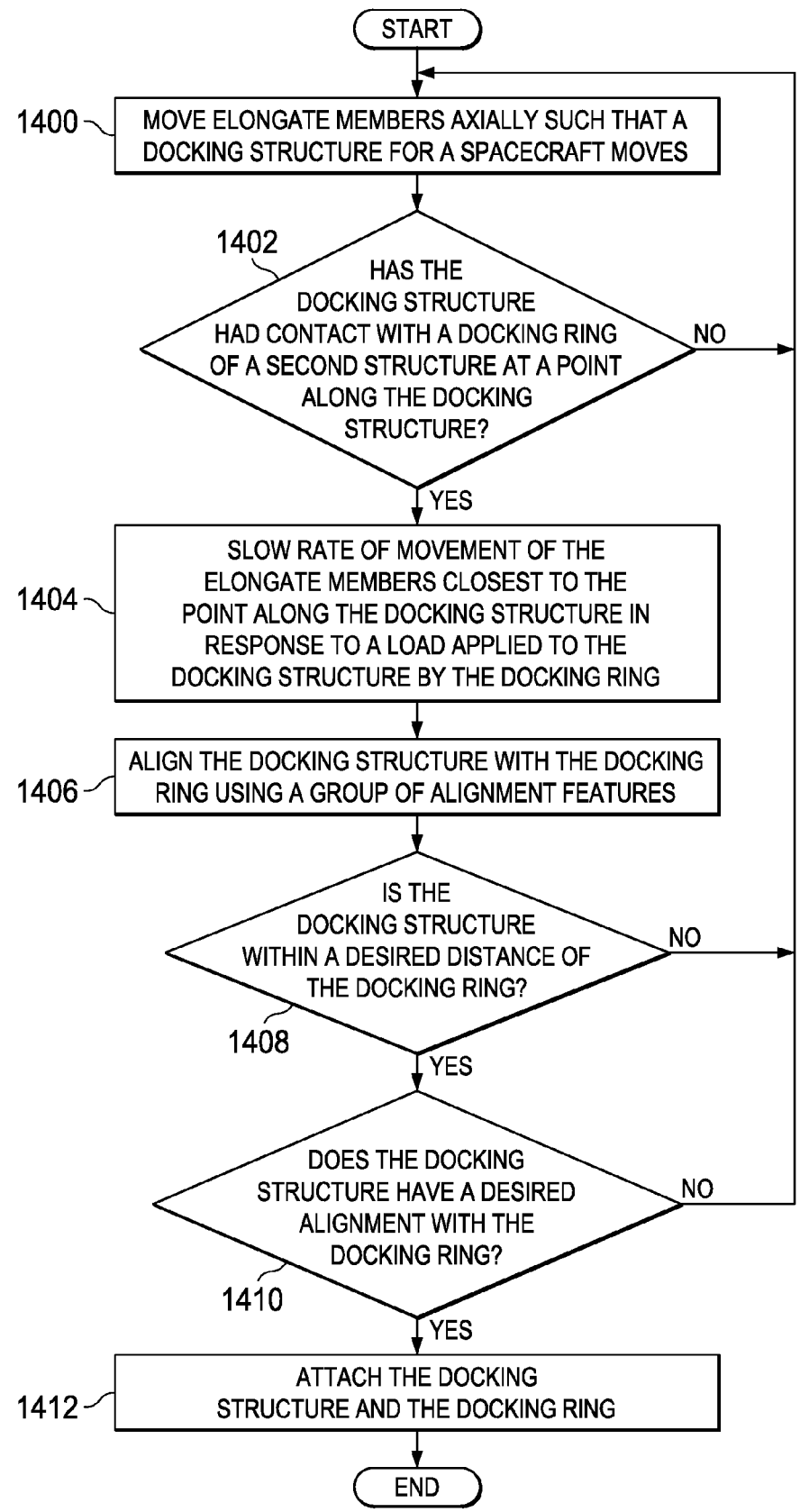
FIG. 14 is an illustration of a flowchart of a process for docking a spacecraft in accordance with an illustrative embodiment.

With reference now to FIG. 14, an illustration of a flowchart of a process for docking a spacecraft is depicted in accordance with an illustrative embodiment. As depicted, the process described in FIG. 14 may be an example of a process implemented in docking environment 200 using docking system 210 in FIG. 2. In particular, the process described in FIG. 14 is an example of the operations that may be performed during extension state 402 shown in state machine 400 in FIG. 4.

The process begins by moving elongate members axially such that a docking structure for the spacecraft moves (operation 1400). Next, the process determines whether the docking structure has contacted with a docking ring of a second structure at a point along the docking structure (operation 1402). If the docking structure has contacted with the docking ring, the contact slows rate of the movement of the elongate members closest to the point along the docking structure in response to a load applied to the docking structure by the docking ring (operation 1404). If the docking structure has not connected with the docking ring, the process returns to operation 1400.

During operation 1400 and operation 1402, each of elongate members 300 operate independently. In other words, while the rate of movement slows for some of elongate members 300, others continue to move at commanded rate 328.

Thereafter, the process aligns the docking structure with a docking ring using a group of alignment features (operation 1406). A determination is then made as to whether the docking structure is within a desired distance of the docking ring (operation 1408).

If the docking structure is within the desired distance of the docking ring, a determination is made as to whether the docking structure has a desired alignment with the docking ring (operation 1410). If so, the process attaches the docking structure and the docking ring (operation 1412) with the process terminating thereafter.

Returning to operation 1408, if the docking structure is not within the desired distance of the docking ring, the process returns to operation 1400, as described above. In a similar fashion with respect to operation 1410, if the docking structure does not have a desired alignment with the docking ring, the process returns to operation 1400.

Figure 15:
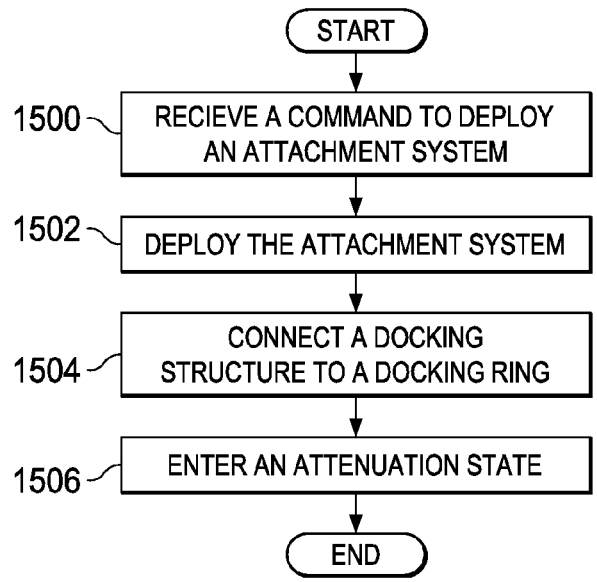
FIG. 15 is another illustration of a flowchart of a process for docking a spacecraft in accordance with an illustrative embodiment.

Referring next to FIG. 15, another illustration of a flowchart of a process for docking a spacecraft is depicted in accordance with an illustrative embodiment. As depicted, the process described in FIG. 15 may be an example of a process implemented in docking environment 200 using docking system 210 in FIG. 2. In particular, the process described in FIG. 15 is an example of operations that may be performed during operation 1412 in FIG. 14.

The process begins by receiving a command to deploy an attachment system (operation 1500). Next, the process deploys the attachment system (operation 1502). The process then connects the docking structure to the docking ring (operation 1504). After the docking structure is connected to the docking ring, the process then enters the attenuation state (operation 1506) with the process terminating thereafter.

Figure 16:
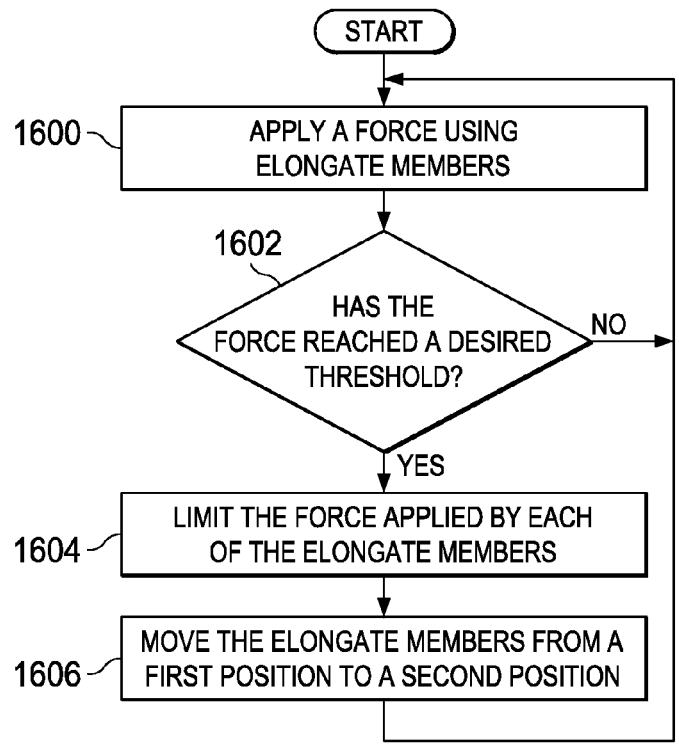
FIG. 16 is yet another illustration of a flowchart of a process for docking a spacecraft in accordance with an illustrative embodiment.

Turning next to FIG. 16, yet another illustration of a flowchart of a process for docking a spacecraft is depicted in accordance with an illustrative embodiment. As depicted, the process described in FIG. 16 may be an example of a process implemented in docking environment 200 using docking system 210 in FIG. 2. In particular, the process described in FIG. 16 is an example of operations that may be performed during attenuation state 406 shown in state machine 400 in FIG. 4.

The process begins by applying a force using the elongate members (operation 1600). Each of elongate members 300 may apply force 342 independent of the other elongate members 300.

Next, a determination is made as to whether the force has reached a desired threshold (operation 1602). For example, a determination is made as to whether force 342 for each of elongate members 300 has reached desired threshold 344.

If the force has reached a desired threshold, the process limits the force applied by each of the elongate members (operation 1604). Limiting the force applied by each of elongate members 300 may be achieved using a slip clutch, as described above. If the force has not reached the desired threshold, the process returns to operation 1600.

Thereafter, the process moves the elongate members from a first position to a second position (operation 1606) with the process returning to operation 1600. Attenuation state 406 will continue until docking structure 212 and docking ring 218 do not move relative to one another beyond selected tolerances. These selected tolerances may be free play 1308 as described in FIG. 13.

After docking is complete, retraction state 408 of docking structure 212 may occur. Retraction state 408 of docking structure 212 may occur in response to a command to disengage attachment system 306, or to bring space station 214 closer to spacecraft 202 such that a pressurized tunnel may be deployed to connect spacecraft 202 to space station 214.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of the spacecraft manufacturing and service method 1700 as shown in FIG. 17 and spacecraft 1800 as shown in FIG. 18. Turning first to FIG. 17, an illustration of a spacecraft manufacturing and service method is depicted in the form of a block diagram in accordance with an illustrative embodiment. Docking system 210 and components within docking system 210 may be fabricated and installed during various stages of spacecraft manufacturing and service method 1700. These modifications may be made on the ground or, in some cases, in space.

During pre-production, spacecraft manufacturing and service method 1700 may include specification and design 1702 of spacecraft 1800 in FIG. 18 and material procurement 1704. During production, component and subassembly manufacturing 1706 and system integration 1708 of spacecraft 1800 in FIG. 18 takes place.

Thereafter, spacecraft 1800 in FIG. 18 may go through certification 1710 in order to be placed in service 1712. Certification 1710 may include meeting customer requirements, industry requirements, governmental requirements, or some combination thereof. While in service by a customer, spacecraft 1800 in FIG. 18 is scheduled for routine maintenance and service 1714, which may include modification, reconfiguration, refurbishment, and other maintenance or service.

Each of the processes of spacecraft manufacturing and service method 1700 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of vendors, subcontractors, and suppliers; and an operator may be company, a military entity, a service organization, and so on.

With reference now to FIG. 18, an illustration of a spacecraft is depicted in the form of a block diagram in which an illustrative embodiment may be implemented. In this illustrative example, spacecraft 1800 is produced by spacecraft manufacturing and service method 1700 in FIG. 17. Spacecraft 1800 may include frame 1802 with a plurality of systems 1804 and interior 1806.

Examples of plurality of systems 1804 include one or more of propulsion system 1808, electrical system 1810, hydraulic system 1812, environmental system 1814, and thermal protection system 1816. Although an aerospace example is shown, different illustrative embodiments may be applied to other industries, such as the aircraft industry, the automotive industry, the ship industry, and/or other suitable industries.

Apparatus and methods embodied herein may be employed during at least one of the stages of spacecraft manufacturing and service method 1700 in FIG. 17. In particular, docking system 210 from FIG. 2 may be installed during any one of the stages of spacecraft manufacturing and service method 1700. For example, without limitation, docking system 210 from FIG. 2 may be installed in spacecraft 1800 during at least one of component and subassembly manufacturing 1706, system integration 1708, routine maintenance and service 1714, or some other stage of spacecraft manufacturing and service method 1700.

In one illustrative example, components or subassemblies produced in component and subassembly manufacturing 1706 in FIG. 17 may be fabricated or manufactured in a manner similar to components or subassemblies produced while spacecraft 1800 is in service 1712 in FIG. 17.

As yet another example, a number of apparatus embodiments, method embodiments, or a combination thereof may be utilized during production stages, such as component and subassembly manufacturing 1706 and system integration 1708 in FIG. 17.

A number of apparatus embodiments, method embodiments, or a combination thereof may be utilized while spacecraft 1800 is in service 1712 and/or during maintenance and service 1714 in FIG. 17. The use of a number of the different illustrative embodiments may substantially expedite the assembly of and/or reduce the cost of spacecraft 1800.

Thus, the illustrative embodiments provide a method and apparatus for docking spacecraft 202. The apparatus comprises elongate members 300, movement systems 302, and force management systems 304 connecting movement systems 302 to elongate members 300. Elongate members 300 are associated with docking structure 212 for spacecraft 202. Movement systems 302 are configured to move elongate members 300 axially such that docking structure 212 for spacecraft 202 moves. Each of elongate members 300 moves independently of one another. Force management systems 304 are configured to limit force 342 applied by each of elongate members 300 to desired threshold 344 during movement of elongate members 300.

With the use of docking system 210, complex control laws, load sensors, or software are not needed dock spacecraft 202 to a second structure. Instead, docking system 210 simplifies the process, as the attenuation of forces occurs in a passive manner, without a closed-loop control system. As a result, less hardware is needed for docking system 210 and therefore, docking system 210 is lighter and less complex than some currently used docking systems.

In addition, docking system 210 operates using a simplified system with mechanical components, which have less probability of undesired results in space. Accordingly, docking system 210 may be more reliable than other docking systems.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a state machine connected to a force management system;
   a first ball screw connected to a base plate configured to connect to a spacecraft, the first ball screw connected to a first power transfer device directly connected to a first movement system configured to receive a first command to move the first ball screw at a first rate such that the first ball screw comprises a first rate of axial movement;
   a second ball screw connected to the base plate and to a second power transfer device directly connected to a second movement system configured to receive a second command to move the second ball screw at a second rate such that the second ball screw comprises a second rate of axial movement, the second rate of axial movement being independent of the first rate of axial movement, such that the first power transfer device comprises a first torque limit determined independent of any intervention from any electronic control system, control law, and software application, in at least one of: the spacecraft, another spacecraft, and a combination thereof, and the second power transfer device comprises a second torque limit determined independent from: the first torque limit, the first command, and any intervention from the any electronic control system, control law, and software application.

2. The apparatus of claim 1, further comprising the base plate connected to a docking structure configured such that in operation the docking structure connects the spacecraft to a second structure selected from one of a docking ring, a space station, a satellite, and a second spacecraft.

3. The apparatus of claim 2, further comprising each power transfer device configured, such that in operation, each power transfer device independently and passively limits a respective force applied by each ball screw respectively in response to a load, applied by the second structure, against each ball screw respectively.

4. The apparatus of claim 2 further comprising:
an attachment system configured to secure the docking structure to the second structure.

5. The apparatus of claim 2, wherein the docking structure is selected from one of a capture ring and a rod.

6. The apparatus of claim 2, further comprising each ball screw configured, such that in operation, movement of the docking structure comprises a number of degrees of freedom.

7. The apparatus of claim 2, wherein the docking structure comprises a mating interface and a group of alignment features.

8. The apparatus of claim 1, each movement system configured to operate in a state determined by the state machine and selected from at least one of: extension, attenuation, or retraction.

9. The apparatus of claim 1, wherein each power transfer device comprises at least one of: a slip clutch, a hydraulic clutch, an electromagnetic clutch, an electromagnetic motor, software, and an electronic controller.

10. The apparatus of claim 1, wherein the movement systems each comprise a respective motor configured to move a corresponding elongate member at a commanded rate.

11. The apparatus of claim 10, further comprising each respective motor configured to reduce a rate of movement of the corresponding elongate member based on a load placed on the corresponding elongate member.

12. The apparatus of claim 10, wherein at least one power transfer device comprises a slip clutch configured to slip when the force reaches a desired threshold such that the corresponding elongate member moves from a first position to a second position.

13. A method for docking a spacecraft, the method comprising:
moving elongate members axially such that a docking structure for the spacecraft moves, wherein each of the elongate members moves independently; and
limiting a force applied by the each of the elongate members to a desired threshold during movement of the elongate members via using:
a first ball screw connected to a first elongate member of the elongate members, and to a base plate configured to connect to the spacecraft, the first ball screw connected to a first power transfer device directly connected to a first movement system configured to receive a first command to move the first ball screw at a first rate such that the first ball screw comprises a first rate of axial movement; and
a second ball screw connected to a second elongate member of the elongate members, and to the base plate and to a second power transfer device directly connected to a second movement system configured to receive a second command to move the second ball screw at a second rate such that the second ball screw comprises a second rate of axial movement, the second rate of axial movement being independent of the first rate of axial movement, such that the first power transfer device comprises a first torque limit determined independent of any intervention from any electronic control system, control law, and software application, in at least one of: the spacecraft, another spacecraft, and a combination thereof, and the second power transfer device comprises a second torque limit determined independent from: the first torque limit, the first command, and any intervention from the any electronic control system, control law, and software application.

14. The method of claim 13 further comprising:
connecting the docking structure to a second structure using an attachment system.

15. The method of claim 13, wherein limiting the force comprises:
passively limiting the force applied by the each of the elongate members in response to a load applied by a second structure.

16. The method of claim 13 further comprising:
reducing a rate of movement of a motor of a corresponding movement system based on a load placed on a corresponding elongate member.

17. A docking system for a spacecraft comprising:
elongate members physically connected to a capture ring;
a first ball screw connected to a first elongate member of the elongate members, and to a base plate configured to connect to the spacecraft, the first ball screw connected to a first power transfer device directly connected to a first movement system configured to receive a first command to move the first ball screw at a first rate such that the first ball screw comprises a first rate of axial movement; and
a second ball screw connected to a second elongate member of the elongate members, and to the base plate and to a second power transfer device directly connected to a second movement system configured to receive a second command to move the second ball screw at a second rate, such that the second ball screw comprises a second rate of axial movement, the second rate of axial movement being independent of the first rate of axial movement, such that the first power transfer device comprises a first torque limit determined independent of any intervention from any electronic control system, control law, and software application, in at least one of: the spacecraft, another spacecraft, and a combination thereof, and the second power transfer device comprises a second torque limit determined independent from: the first torque limit, the first command, and any intervention from the any electronic control system, control law, and software application;
alignment features positioned along a mating surface of the capture ring and configured to align the capture ring with a second structure; and
force management systems connecting the motors to the elongate members and configured to limit a force applied by the each of the elongate members to a desired threshold during movement of the elongate members.

18. The docking system of claim 17, wherein the force management systems passively limit the force applied by the each of the elongate members in response to a load applied by the second structure, and wherein a force management system of the force management systems is configured to slip when the force reaches the desired threshold such that a corresponding elongate member moves from a first position to a second position.

19. The docking system of claim 17, wherein the motors are configured to operate in a state selected from at least one of extension, attenuation, or retraction.

20. The docking system of claim 17, wherein the force applied by the elongate members are limited based on a position of the capture ring relative to the second structure.

* * * * *